United States Patent
Serkh et al.

(10) Patent No.: US 9,920,819 B2
(45) Date of Patent: Mar. 20, 2018

(54) TENSIONER

(71) Applicant: GATES CORPORATION, Denver, CO (US)

(72) Inventors: Alexander Serkh, Troy, MI (US); Dean Schneider, Washington, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 15/334,111

(22) Filed: Oct. 25, 2016

(65) Prior Publication Data
US 2017/0037940 A1 Feb. 9, 2017

Related U.S. Application Data

(63) Continuation-in-part of application No. 14/790,237, filed on Jul. 2, 2015, now abandoned, which is a continuation-in-part of application No. 14/173,978, filed on Feb. 6, 2014, now Pat. No. 9,140,338.

(51) Int. Cl.
| F16H 7/12 | (2006.01) |
| F16H 7/10 | (2006.01) |
| F16H 7/08 | (2006.01) |

(52) U.S. Cl.
CPC ......... F16H 7/1218 (2013.01); F16H 7/0831 (2013.01); F16H 7/1281 (2013.01); *F16H 2007/081* (2013.01); *F16H 2007/0806* (2013.01); *F16H 2007/0842* (2013.01); *F16H 2007/0865* (2013.01); *F16H 2007/0874* (2013.01); *F16H 2007/0893* (2013.01)

(58) Field of Classification Search
CPC ........... F16H 2007/0874; F16H 7/1281; F16H 2007/0806; F16H 2007/081; F16H 2007/0846

USPC .................................................. 474/134, 112
See application file for complete search history.

(56) References Cited

U.S. PATENT DOCUMENTS

| 1,338,293 A | * | 4/1920 | Fuchs | F16H 7/1254 |
| | | | | 474/134 |
| 1,579,245 A | * | 4/1926 | Pennington | B62D 55/108 |
| | | | | 305/134 |

(Continued)

FOREIGN PATENT DOCUMENTS

| DE | 102005039719 A1 | 3/2007 |
| JP | 2005537439 A | 12/2005 |

OTHER PUBLICATIONS

Notice of Allowance of Patent Korea application No. 10-2016-7024304, Korean Intellectual Property Office, Delivery date: Jul. 31, 2017.

(Continued)

*Primary Examiner* — Henry Y Liu
(74) *Attorney, Agent, or Firm* — Jeffrey A. Thurnau, Esq.; Paul N. Dunlap, Esq.

(57) ABSTRACT

A tensioner comprising a base, a first pivot arm pivotally engaged to the base, a first pulley journalled to the first pivot arm, a second pivot arm pivotally engaged to the base, a second pulley journalled to the second pivot arm, a flexible tensile member having a toothed engagement with the first pivot arm and a toothed engagement with the second pivot arm whereby the first pivot arm and the second pivot arm move in a coordinated manner, and a tensioner assembly pivotally engaged to the base and engaged with the flexible tensile member.

8 Claims, 35 Drawing Sheets

(56) References Cited

U.S. PATENT DOCUMENTS

| | | | | |
|---|---|---|---|---|
| 2,352,797 | A | * | 7/1944 | Miller .................... F16H 35/02 474/134 |
| 2,726,364 | A | * | 12/1955 | Merritt ................. H01H 35/006 318/475 |
| RE27,861 | E | * | 1/1974 | Kraus ................... F16H 7/1281 474/109 |
| 4,416,647 | A | * | 11/1983 | White, Jr. ............. F16H 7/1281 474/134 |
| 4,758,208 | A | * | 7/1988 | Bartos ................... F16H 7/1281 474/111 |
| 4,981,116 | A | * | 1/1991 | Trinquard ............... F02B 67/06 123/90.31 |
| 6,609,989 | B2 | * | 8/2003 | Bogner .................. F02B 63/04 474/134 |
| 6,648,783 | B1 | * | 11/2003 | Bogner ................. F16H 7/1281 474/134 |
| 6,652,401 | B2 | * | 11/2003 | Liu ....................... F16H 7/1209 474/134 |
| 6,960,145 | B2 | * | 11/2005 | Fraley, Jr. ............ B62D 5/0424 180/444 |
| 7,494,434 | B2 | * | 2/2009 | McVicar ............... F16H 7/1281 474/101 |
| 7,901,310 | B2 | * | 3/2011 | Lolli ..................... F16H 7/1281 474/101 |
| 8,057,334 | B2 | * | 11/2011 | Kotzur .................. F16H 7/1281 180/65.21 |
| 8,092,328 | B2 | * | 1/2012 | Dec ...................... F16H 7/1218 474/135 |
| 8,327,972 | B1 | * | 12/2012 | Schneider ............... F16H 7/023 180/443 |
| 8,353,795 | B2 | * | 1/2013 | Montani ............... F16H 7/1281 474/118 |
| 8,439,780 | B2 | * | 5/2013 | Ruffini .................. F16H 7/1281 474/112 |
| 8,602,930 | B2 | * | 12/2013 | Deneszczuk .......... F16H 7/1281 474/112 |
| 8,813,928 | B2 | | 8/2014 | Schneider et al. |
| 8,821,328 | B2 | * | 9/2014 | Jud ....................... F16H 7/1281 474/134 |
| 2002/0039944 | A1 | * | 4/2002 | Ali ........................ F16H 7/1209 474/135 |
| 2002/0086751 | A1 | * | 7/2002 | Bogner .................. F02B 63/04 474/134 |
| 2003/0153421 | A1 | * | 8/2003 | Liu ....................... F16H 7/1209 474/134 |
| 2003/0176249 | A1 | * | 9/2003 | Polster .................. F16H 7/1209 474/134 |
| 2003/0176250 | A1 | * | 9/2003 | Austin ................... F02B 67/06 474/134 |
| 2003/0199350 | A1 | * | 10/2003 | Henry ..................... F01L 1/34 474/138 |
| 2003/0216203 | A1 | * | 11/2003 | Oliver ................... F16H 7/1281 474/134 |
| 2003/0220164 | A1 | * | 11/2003 | Tamai ................... F16H 7/1281 474/134 |
| 2004/0043854 | A1 | * | 3/2004 | Fraley, Jr. ............. B62D 5/0424 474/134 |
| 2004/0072642 | A1 | * | 4/2004 | Serkh .................... F16H 7/1218 474/134 |
| 2005/0181901 | A1 | * | 8/2005 | Shin ...................... F16H 7/1218 474/134 |
| 2006/0100051 | A1 | * | 5/2006 | Di Giacomo ............. F16G 1/28 474/170 |
| 2006/0217222 | A1 | * | 9/2006 | Lolli ..................... F16H 7/1281 474/134 |
| 2006/0287146 | A1 | * | 12/2006 | McVicar ............... F16H 7/1281 474/109 |
| 2007/0037648 | A1 | * | 2/2007 | Di Giacomo ......... F16H 7/1281 474/134 |
| 2008/0070730 | A1 | * | 3/2008 | Nelson .................. F16H 7/1254 474/134 |
| 2008/0176687 | A1 | | 7/2008 | Schever |
| 2008/0214342 | A1 | * | 9/2008 | Montani ............... F16H 7/1281 474/134 |
| 2011/0177897 | A1 | | 7/2011 | Ward et al. |
| 2011/0256971 | A1 | * | 10/2011 | Kilshaw .................. B62J 13/00 474/134 |
| 2011/0294612 | A1 | * | 12/2011 | Kato ........................ F16H 7/08 474/91 |
| 2012/0318589 | A1 | * | 12/2012 | Staley ................... F16H 7/1281 180/65.21 |
| 2013/0040770 | A1 | * | 2/2013 | Wolf ..................... F16H 7/1281 474/134 |
| 2013/0203535 | A1 | * | 8/2013 | Mack .................... F16H 7/1281 474/134 |
| 2013/0260932 | A1 | * | 10/2013 | Adam ................... F16H 7/1218 474/134 |
| 2015/0219189 | A1 | * | 8/2015 | Serkh .................... F16H 7/1218 474/112 |
| 2015/0300462 | A1 | * | 10/2015 | Serkh .................... F16H 7/1218 474/112 |

OTHER PUBLICATIONS

European Patent Office, International Search Report PCT application No. PCT/US2017/057820; dated Jan. 29, 2018.

Russian Patent Office, Office Action Russian patent application No. 2016135769, dated Nov. 8, 2017.

* cited by examiner

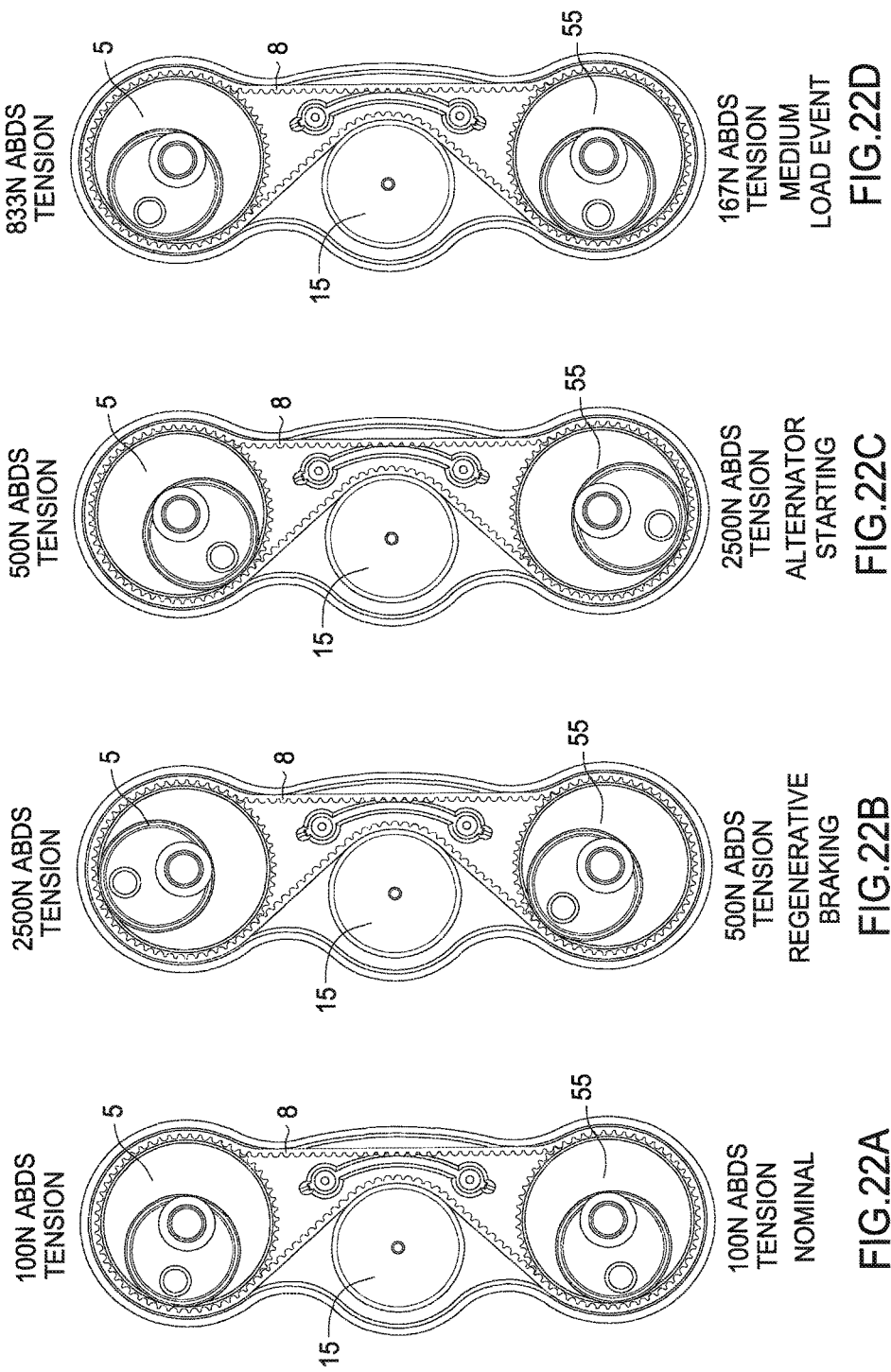

TENSIONER

CROSS REFERENCE TO RELATED APPLICATIONS

This application is a continuation-in-part of and claims priority from U.S. application Ser. No. 14/173,978 filed Feb. 6, 2014 and U.S. application Ser. No. 14/790,237 filed Jul. 2, 2015.

FIELD OF THE INVENTION

The invention relates to a tensioner, and more particularly, to a tensioner having a first pivot arm and a second pivot arm mounted to a base, a flexible member trained between the first pivot arm and the second pivot arm so the pivot arms move in a coordinated manner, and a tensioner assembly mounted to the base engaging the flexible member.

BACKGROUND OF THE INVENTION

In most belt drive applications the ability to maintain proper belt tension is important to ensure power transmission without slippage of the belt. The lowest tension span in a belt drive is commonly referred to as the slack side span. Tensioners are traditionally positioned on the slack side span of a belt drive and are tasked with maintaining the proper minimum belt tension in this span. Using the belt rotation direction as a guide, this span is the span located just after the power providing pulley or crankshaft in this case. For instance, as the crankshaft rotates, the slack side span will be the span where the belt has just left the crankshaft pulley and the tight side span will be the span approaching the crankshaft pulley.

Belt alternator starter (BAS) systems utilize an alternator that also functions as motor. This is sometimes referred to as a motor-generator. The operation of the BAS system is such that when the engine is running, the alternator primarily behaves in a traditional manner and the belt is loaded normally with the power being provided by the engine crankshaft pulley and loaded by the alternator. In BAS systems the drive is typically arranged to position the alternator as the next accessory after the belt passes over the crankshaft. In this arrangement, the belt tensioner should be located between the crankshaft pulley and the alternator. The tensioner is located just before the alternator using the belt rotation direction as a guide.

BAS systems bring a unique problem to the belt drive. The alternator acts as both a load on the belt drive and a power provider for the belt drive. The BAS system alternator is used to start the engine and the alternator is used to provide power to the engine. In start instances, the alternator pulley becomes a power provider for the drive. This typically transforms the location of the slack span in the drive to the span following the alternator pulley. Additionally, the tight side span is now the span between the alternator and the crankshaft. Since a traditional tensioner is designed to simply maintain a minimum level of slack side tension, the now high tension in the belt at the tensioner location causes extreme movement of the tensioner. Additionally, this situation creates the need for a second tensioner in a location on the new slack side span.

The traditional approach to solving this problem is to create a belt drive with two tensioners. This second tensioner is typically a tensioner with high resistance to movement away from the belt. The second tensioner is often an expensive hydraulic tensioner. This two tensioner arrangement also requires an excessively long belt to accommodate the multiple tensioners in the drive. This often results in an expensive solution.

Representative of the art is U.S. Pat. No. 7,494,434 which discloses an accessory drive for an engine with a belt driven starter generator adapted for driving and being driven by the engine. In an exemplary embodiment, the drive includes a first engine drive pulley and a second starter drive pulley. A drive belt engages the drive pulleys for driving either pulley from the other. A dual belt tensioner made as a preassembled unit has a carrier with a central pivot mounted to the engine and first and second carrier arms extending radially from the central pivot. A first tensioner mounted on the first arm carries a first tensioner pulley biased against a first belt run adjacent the second drive pulley that is slack during engine starting. A second tensioner pulley carried on the second arm is biased against a second belt run adjacent the second drive pulley that is taut during engine starting A hydraulic strut connected to the second arm, and preferably included in the preassembled unit, provides moderate biasing for the second tensioner pulley during normal engine operation and velocity sensitive resistance, to increased belt forces, that limits reactive movement of the second tensioner pulley during engine starting and transient engine operation.

What is needed is a tensioner having a first pivot arm and a second pivot arm mounted to a base, a flexible member trained between the first pivot arm and the second pivot arm so the pivot arms move in a coordinated manner, and a tensioner assembly mounted to the base engaging the flexible member. The present invention meets this need.

SUMMARY OF THE INVENTION

The primary aspect of the invention is to provide a tensioner having a first pivot arm and a second pivot arm mounted to a base, a flexible member trained between the first pivot arm and the second pivot arm so the pivot arms move in a coordinated manner, and a tensioner assembly mounted to the base engaging the flexible member.

Other aspects of the invention will be pointed out or made obvious by the following description of the invention and the accompanying drawings.

The invention comprises a tensioner comprising a base, a first pivot arm pivotally engaged to the base, a first pulley journalled to the first pivot arm, a second pivot arm pivotally engaged to the base, a second pulley journalled to the second pivot arm, a flexible tensile member having a toothed engagement with the first pivot arm and a toothed engagement with the second pivot arm whereby the first pivot arm and the second pivot arm move in a coordinated manner, and a tensioner assembly pivotally engaged to the base and engaged with the flexible tensile member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 22A illustrates pivot arm position during an operating condition.

FIG. 22B illustrates pivot arm position during an operating condition.

FIG. 22C illustrates pivot arm position during an operating condition.

FIG. 22D illustrates pivot arm position during an operating condition.

DETAILED DESCRIPTION OF THE PREFERRED EMBODIMENT

Figure 1:
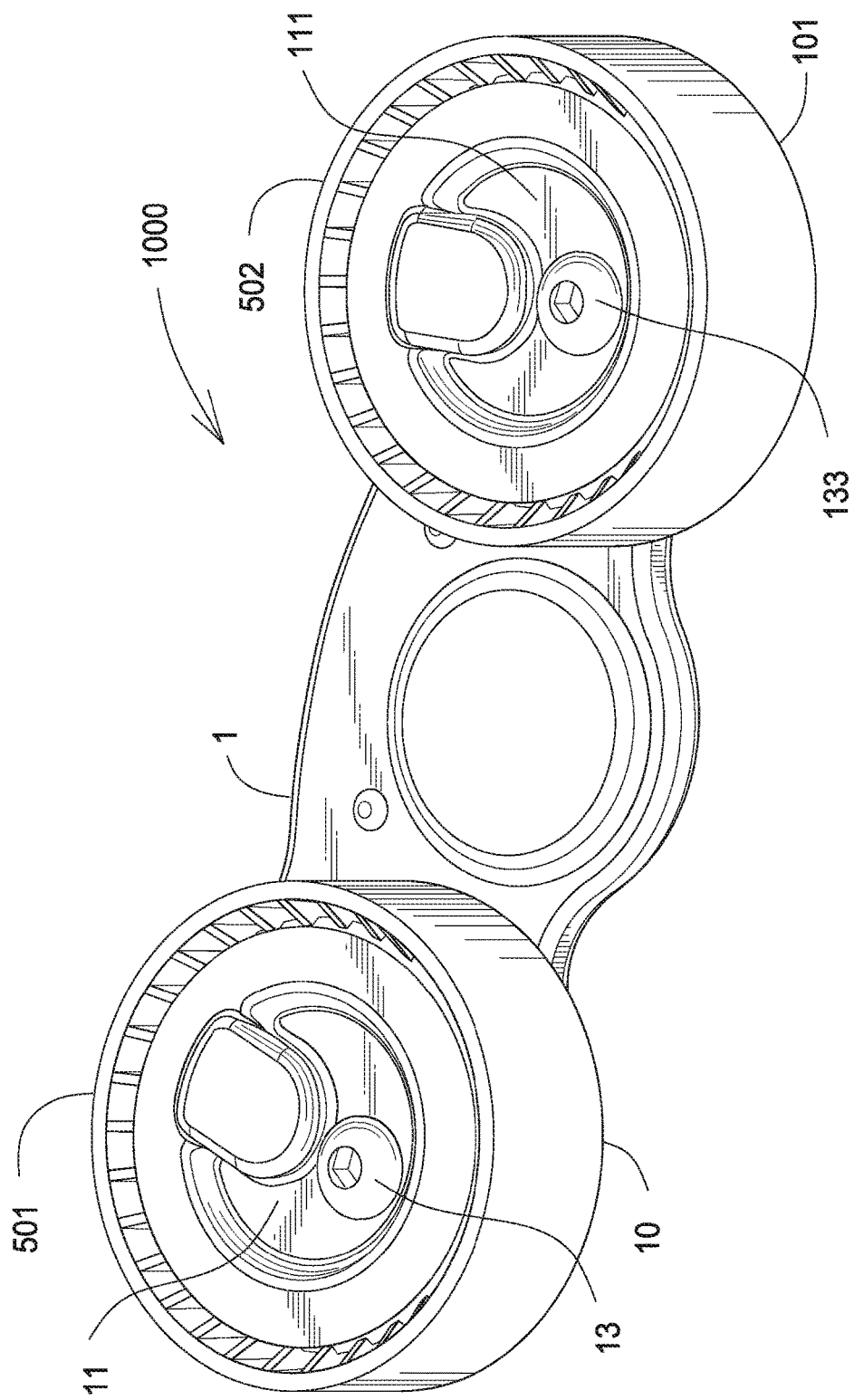
FIG. 1 is a top perspective view of the device.

FIG. 1 is a top perspective view of the device. The inventive tensioner 1000 comprises a first tensioner assembly 501 and a second tensioner assembly 502 each pivotally mounted to a base 1.

Figure 2:
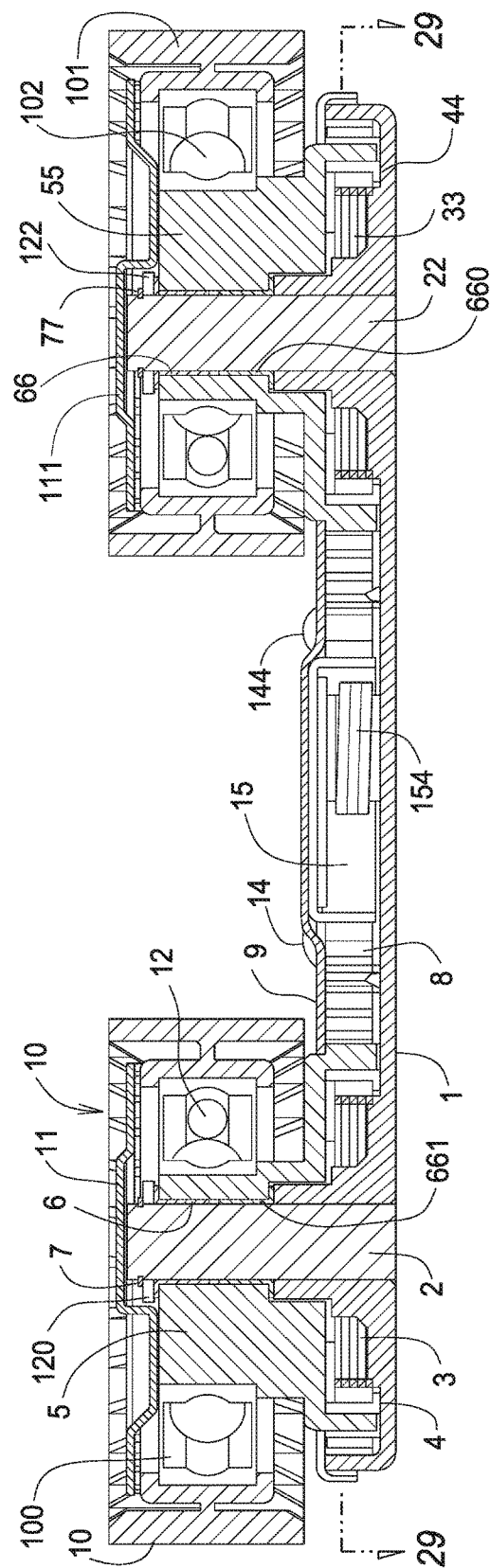
FIG. 2 is a cross-section view of the device.

FIG. 2 is a cross-section view of the device. Extending from base 1 is shaft 2 and shaft 22. Pivot arm 5 is pivotally journalled to shaft 2 through a bushing 6. The pivot axis of pivot arm 5 is coaxial with shaft 2. Pivot arm 55 is pivotally journalled to shaft 22 through a bushing 66. The pivot axis of pivot arm 55 is coaxial with shaft 22. Shaft 2 and shaft 22 are not coaxial. The pivot axis of arm 5 is not coaxial with the pivot axis of arm 55.

Clutch spring 3 is engaged between damping assembly 4 and base 1. Clutch spring 33 is engaged between damping assembly 44 and base 1. Pulley 101 is journalled to pivot arm 55 through bearing 102. Pulley 10 is journalled to pivot arm 5 through bearing 12. Clutch spring 3 and clutch spring 33 are used to activate the damping function.

Fastener 14 and fastener 144 retain cover 9 on base 1. Arm 5 is retained on base 1 by retaining ring 7. Tensioner assembly 15 is retained on base 1 by cover 9. Cover 9 protects the internal components from debris.

Figure 3:
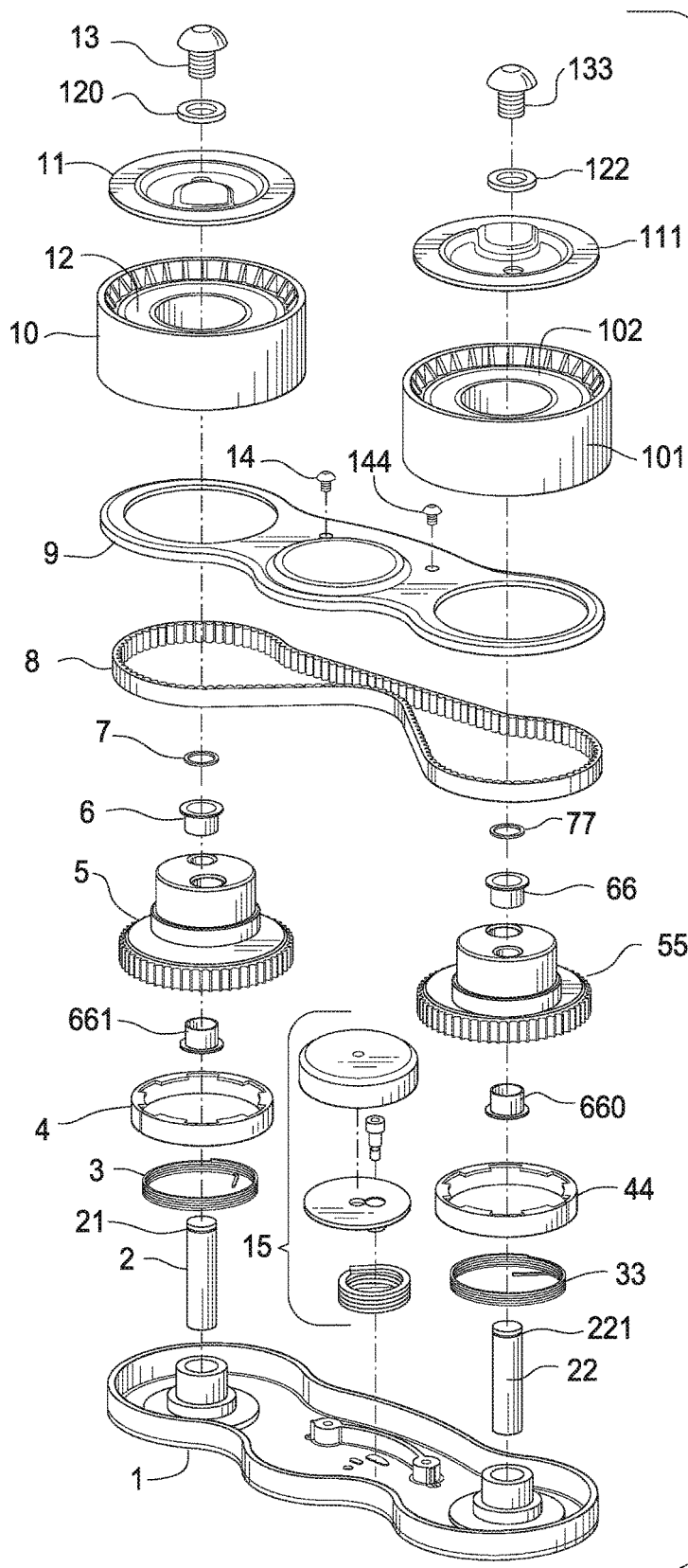
FIG. 3 is an exploded view of the device.

FIG. 3 is an exploded view of the device. Washer 120 is disposed between retaining ring 7 and bushing 6. Washer 122 is disposed between retaining ring 77 and bushing 66. Arm 5 pivots about bushing 6 and bushing 661. Arm 55 pivots about bushing 660 and bushing 66. Fastener 13 engages arm 5. Fastener 133 engages arm 55.

Figure 4:
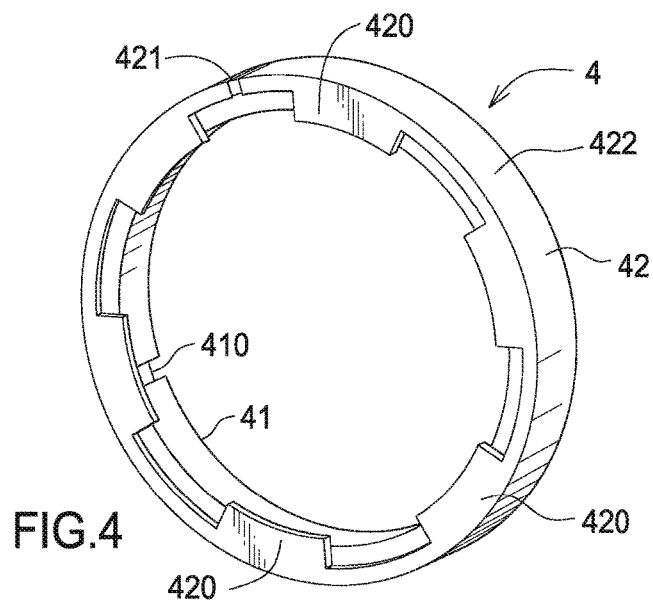
FIG. 4 is a detail of a damping assembly.
Figure 5:
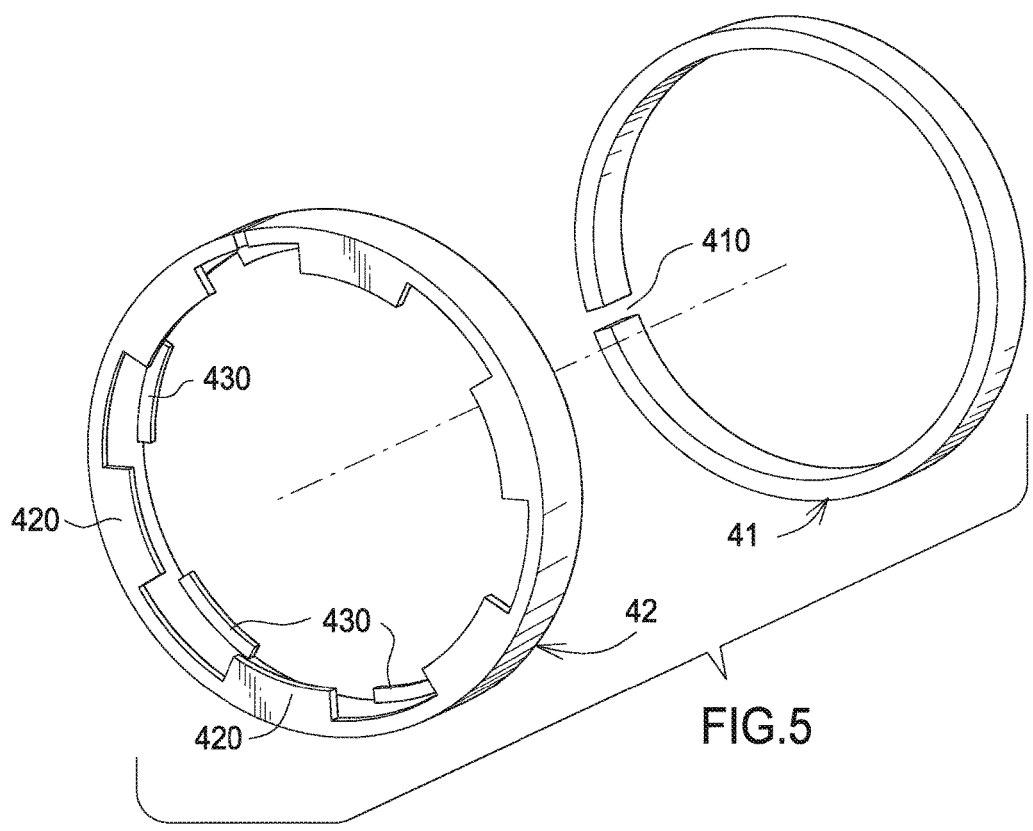
FIG. 5 is an exploded view of the damping assembly in FIG. 4.

FIG. 4 is a detail of a damping assembly. FIG. 5 is an exploded view of the damping assembly in FIG. 4. Damping assembly 4 comprises damping shoe 41 and damping ring 42. Damping ring 42 is coaxial with damping shoe 41. Damping ring 42 is cylindrical in shape with a gap 421 in an axial direction. Damping ring 42 has a plurality of tabs 420 and 430 projecting inwardly for containing damping shoe 41. Damping shoe 41 is cylindrical in shape with a gap 410 in an axial direction. The outer surface 422 of damping ring 42 frictionally engages inner surface 51 of pivot arm 5.

Figure 6:
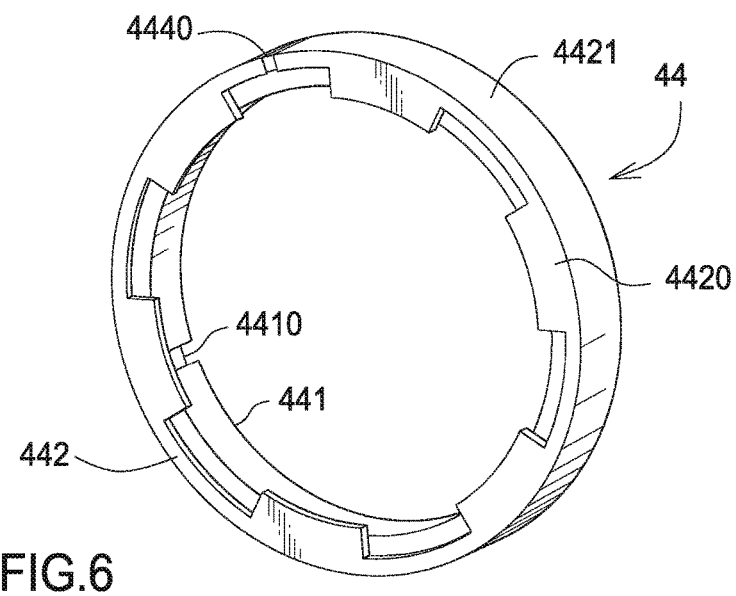
FIG. 6 is a detail of a damping assembly.
Figure 7:
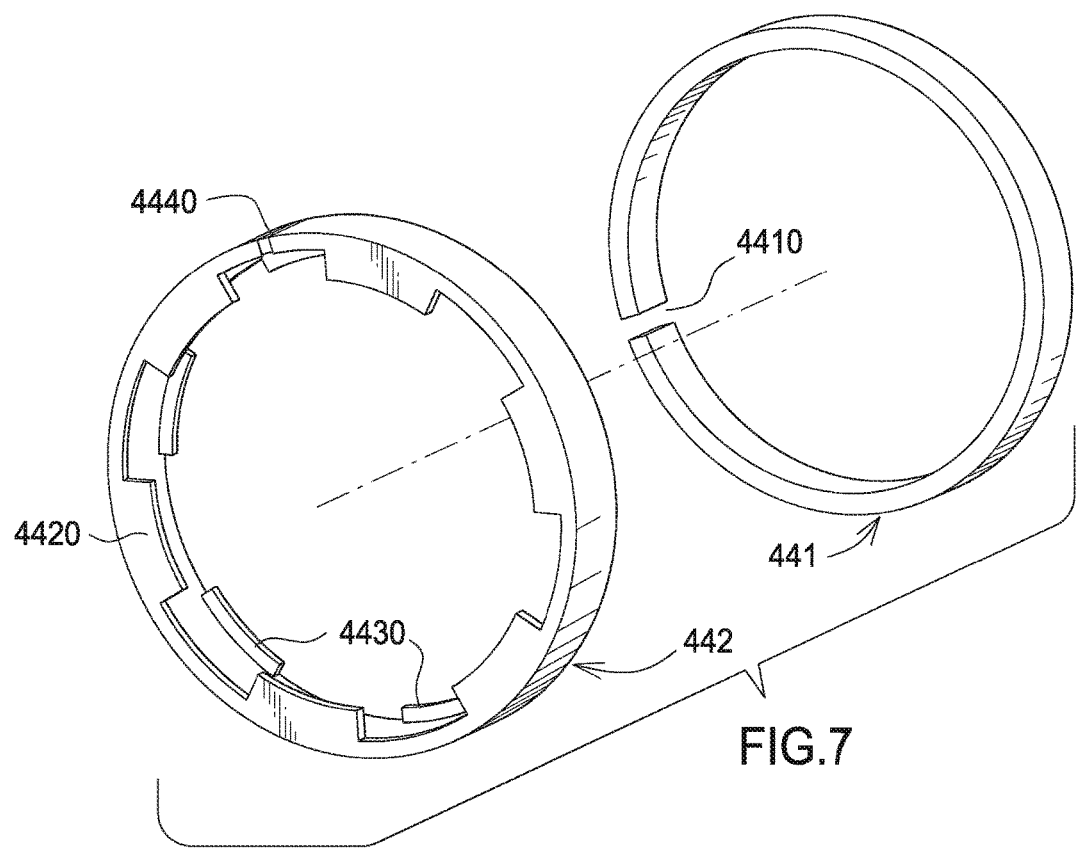
FIG. 7 is an exploded view of the damping assembly in FIG. 6.

FIG. 6 is a detail of a damping assembly. FIG. 7 is an exploded view of the damping assembly in FIG. 6. Damping assembly 44 comprises damping shoe 441 and damping ring 442. Damping ring 442 is coaxial with damping shoe 441. Damping ring 442 is cylindrical in shape with a gap 4440 extending axially. Damping ring 442 has a plurality of tabs 4420 and tabs 4430 projecting inward for containing damping shoe 441. Damping shoe 441 is cylindrical in shape with a gap 4410 extending axially. The outer surface 4421 of damping ring 442 frictionally engages inner surface 551 of pivot arm 55.

Figure 8:
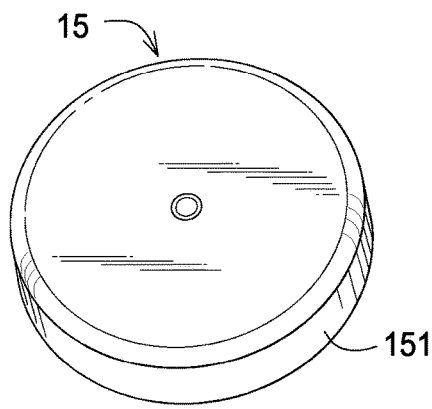
FIG. 8 is a top perspective view of a synchronous tensioner assembly.
Figure 9:
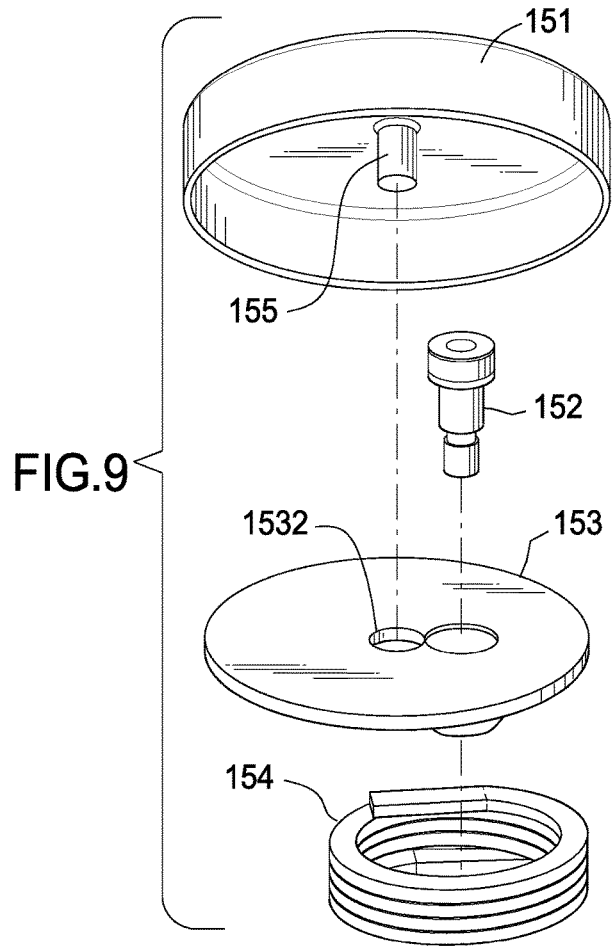
FIG. 9 is an exploded view of the synchronous tensioner assembly in FIG. 8.
Figure 23:
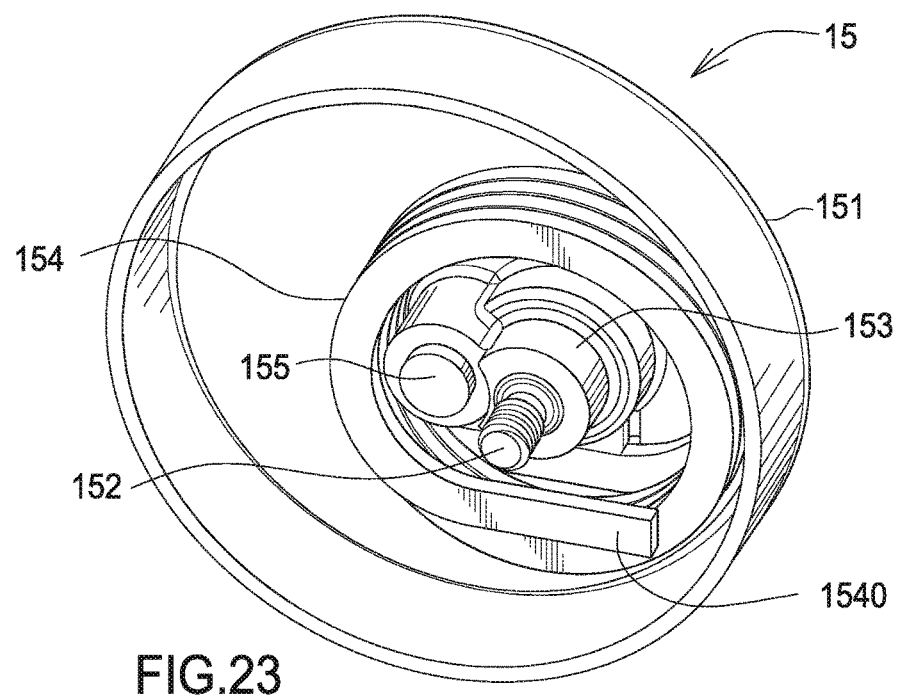
FIG. 23 is an underside view of the tensioner assembly in FIG. 8.
Figure 24:
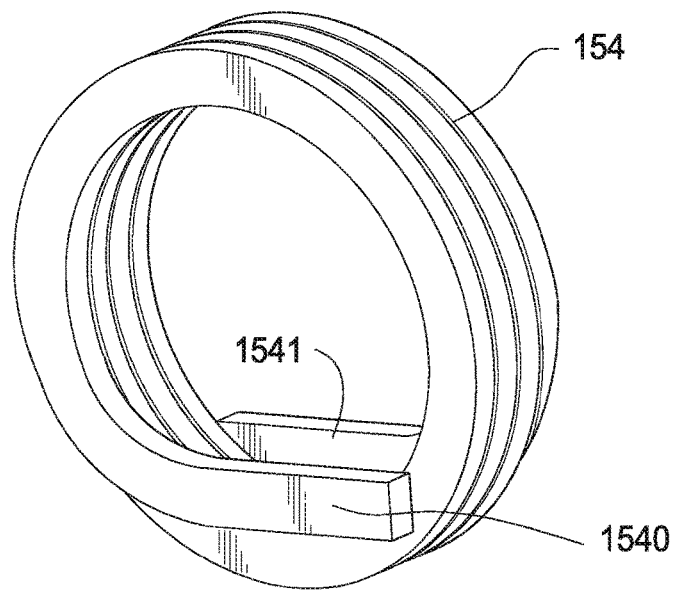
FIG. 24 is a detail of a tensioner spring.
Figure 25:
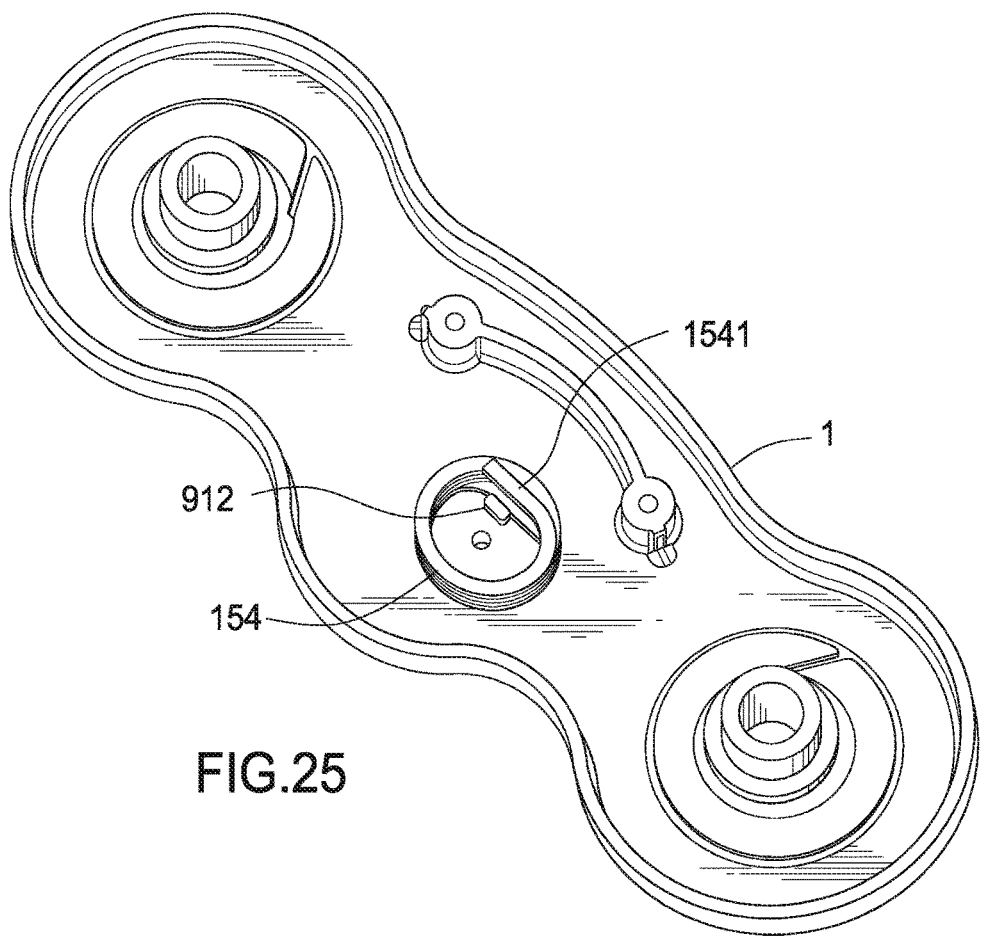
FIG. 25 is a detail of the base.

FIG. 8 is a top perspective view of a tensioner assembly. FIG. 9 is an exploded view of the tensioner assembly in FIG. 8. Synchronous tensioner assembly 15 comprises a rotatable belt guide 151, fastener 152, arm 153 and spring 154. Belt guide 151 is journalled to arm 153 by shaft 155. Shaft 155 engages hole 1532 in arm 153. Arm 153 is pivotally attached to base 1 by fastener 152. Spring 154 is fixedly attached to arm 153 by tab 1530 and tab 1531, see FIG. 28. Spring 154 acts as a biasing member to apply a torque to arm 153, which then applies load to belt 8. FIG. 23 is an underside view of the tensioner assembly in FIG. 8. FIG. 24 is a detail of a tensioner spring. FIG. 25 is a detail of the base. Spring end 1540 is engaged between tab 912 and tab 913 in base 1 which prevents rotation of spring 154 when loaded, see FIG. 21 and FIG. 25.

Shaft 2 is fixedly attached to base 1. Clutch spring is fixedly attached to base 6 through tang 31 which engages slot 911 of base 1, see FIG. 19 and FIG. 21. Pivot arm 5 and bushing 6 and bushing 661 are journalled to shaft 2 through bore 54. Washer 120 is coaxial with shaft 2. Retaining ring 7 is fixedly located on shaft 2 in groove 21. Damping assembly 4 is coaxial with pivot arm 5.

Shaft 22 is fixedly attached to base 1. Clutch spring is attached to base 1 through tang 331 which engages slot 910, see FIG. 20 and FIG. 21. Pivot arm 55 and bushing 66 and bushing 660 are pivotally attached to shaft 22 through bore 554. Washer 122 is coaxial with shaft 22. Retaining ring 77 is fixedly located on shaft 22 in groove 221. Retaining ring 7 retains arm 5 on shaft 2. Retaining ring 7 is fixedly located on shaft 2 in groove 21. Retaining ring 77 retains arm 55 on shaft 22. Damping assembly 44 is coaxial with pivot arm 55. Damping assembly 44 frictionally engages pivot arm damping surface 551.

Figure 10:
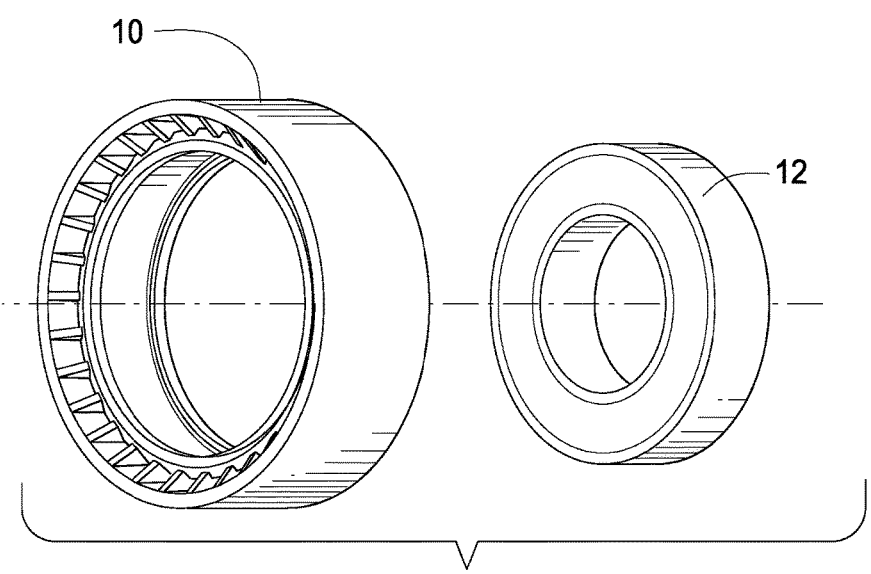
FIG. 10 is an exploded view of an idler assembly.
Figure 11:
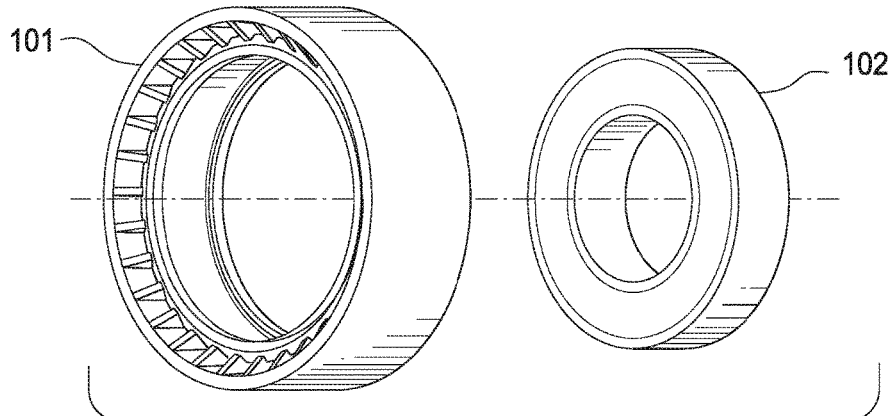
FIG. 11 is an exploded view of an idler assembly.

FIG. 10 is a detail of an idler assembly. FIG. 11 is a detail of an idler assembly. Pulley 10 is journalled to bearing 12. Bearing 12 is journalled to pivot arm 5 on surface 53. Pulley 101 is journalled to bearing 102. Bearing 102 is journalled to pivot arm 55 on surface 553.

Figures 12A, 12B:
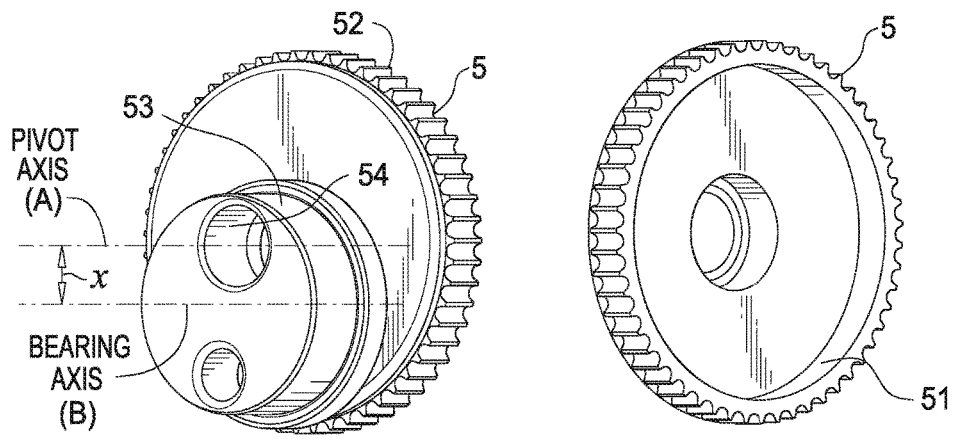
FIG. 12A is a detail of a pivot arm.
FIG. 12B is a detail of a pivot arm.
Figures 13A, 13B:
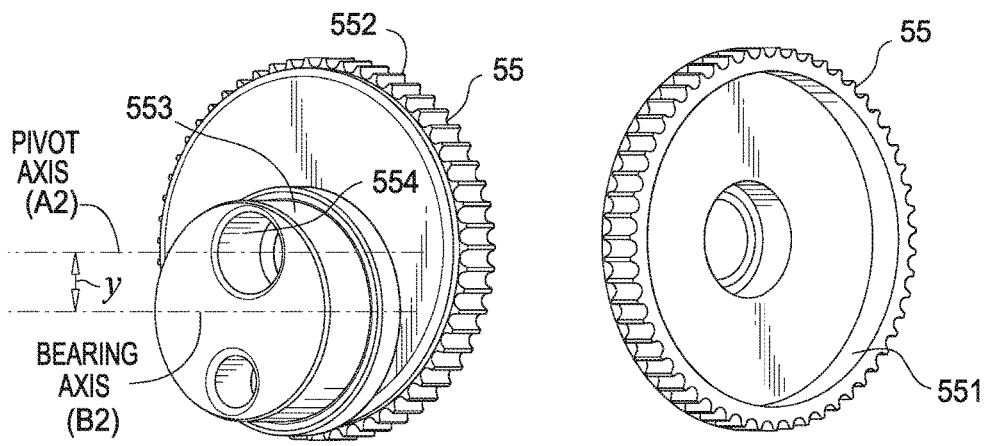
FIG. 13A is a detail of a pivot arm.
FIG. 13B is a detail of a pivot arm.

FIG. 12A is a detail of a pivot arm. FIG. 12B is a detail of a pivot arm. FIG. 13A is a detail of a pivot arm. FIG. 13B is a detail of a pivot arm. Pivot arm bearing mounting surface 53 receives bearing 12 and is not coaxial with pivot arm bore 54, see bearing axis (A) and pivot axis (B) respectively. Pivot arm bearing mounting surface 553 receives bearing 102 and is not coaxial with pivot arm bore 554. Bore 54 engages shaft 2 which receives fastener 13. Bore 554 engages shaft 22 which receives fastener 133.

Pivot arm 5 pivots about the pivot axis (A). Bearing 12 rotates about the bearing axis (B). Bearing axis (B) and pivot axis (A) are not coaxial, and instead are offset from each other by a distance (X).

Pivot arm 55 pivots about the pivot axis (A2). Bearing 102 rotates about the bearing axis (B2). Bearing axis (B2) and the pivot axis (A2) are not coaxial, and instead are offset from each other by a distance (Y).

Belt 8 engages sprocket 52 and sprocket 552 on pivot arm 5 and pivot arm 55 respectively. Belt 8 may be toothed, but may also comprise any flexible member suitable for bearing a tensile load. Sprocket 52 and sprocket 552 are each toothed to positively engage belt 8.

Figure 14:
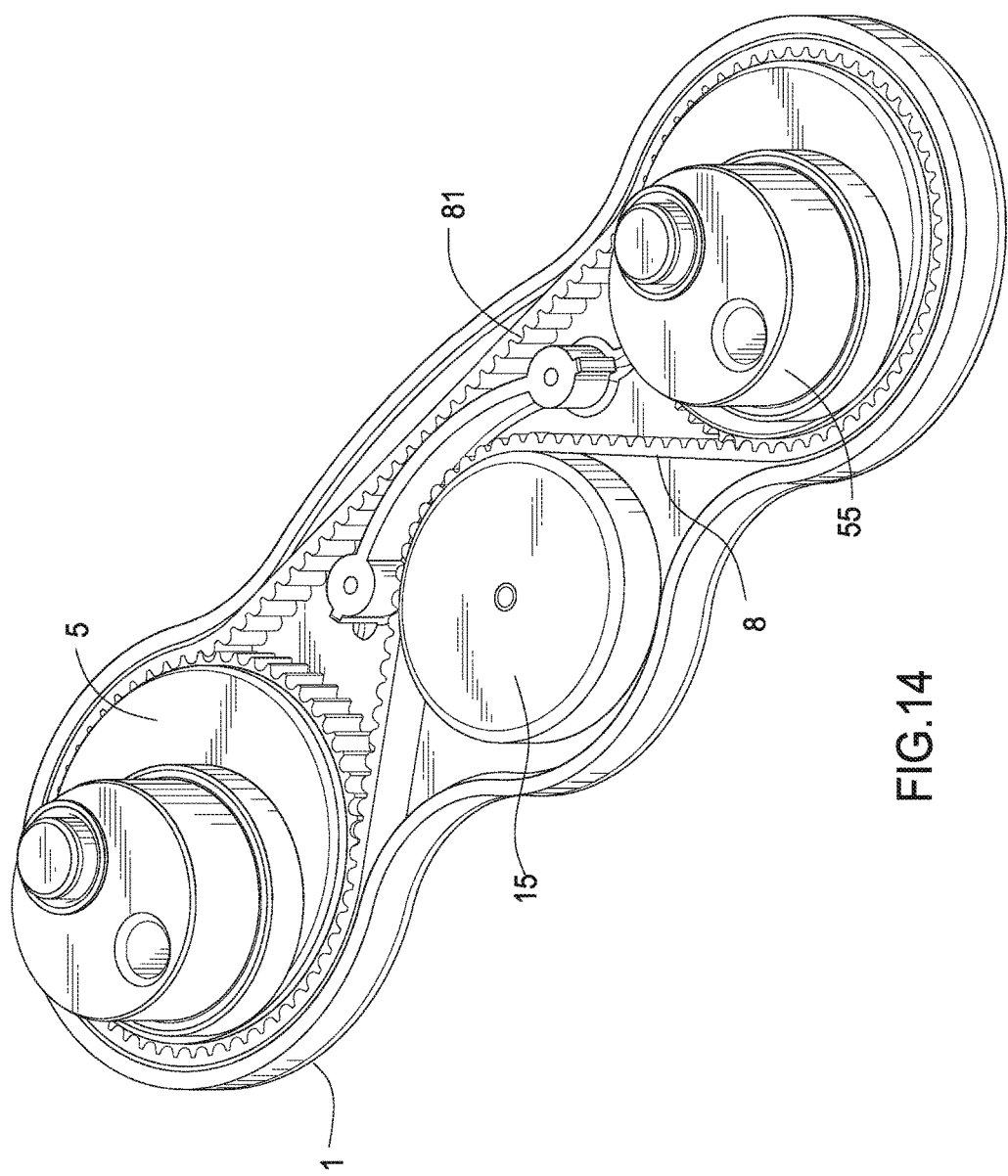
FIG. 14 is a top perspective view of the internals of the device.

FIG. 14 is a top perspective view of the internals of the device. Belt 8 engages tensioner assembly 15. All tensile loads in belt 8 and in belt 200 are imparted by tensioner assembly 15. Rotation of pivot arm 5 causes movement of belt 8 which in turn causes movement in a synchronized or coordinated manner of pivot arm 55 in the same rotational direction as pivot arm 5. Rotation of pivot arm 55 causes movement of belt 8 which in turn causes movement in a synchronized or coordinated manner of pivot arm 5 in the same rotational direction as pivot arm 55, as well. Hence, in operation pivot arm 5 and pivot arm 55 move substantially simultaneously by action of belt 8.

A "synchronized" movement may be described as a movement of pivot arm 5 and pivot arm 55 wherein each pivot arm rotates at substantially the same time through substantially the same angle. A "coordinated" movement may be described as a movement of pivot arm 5 and pivot arm 55 wherein each pivot arm rotates at substantially the same time, but not through an identical angle for both pivot arms. Rotation of the pivot arms through non-identical angles may be caused by stretch of belt 8 for example, as explained herein, see FIG. 22.

Figure 15:
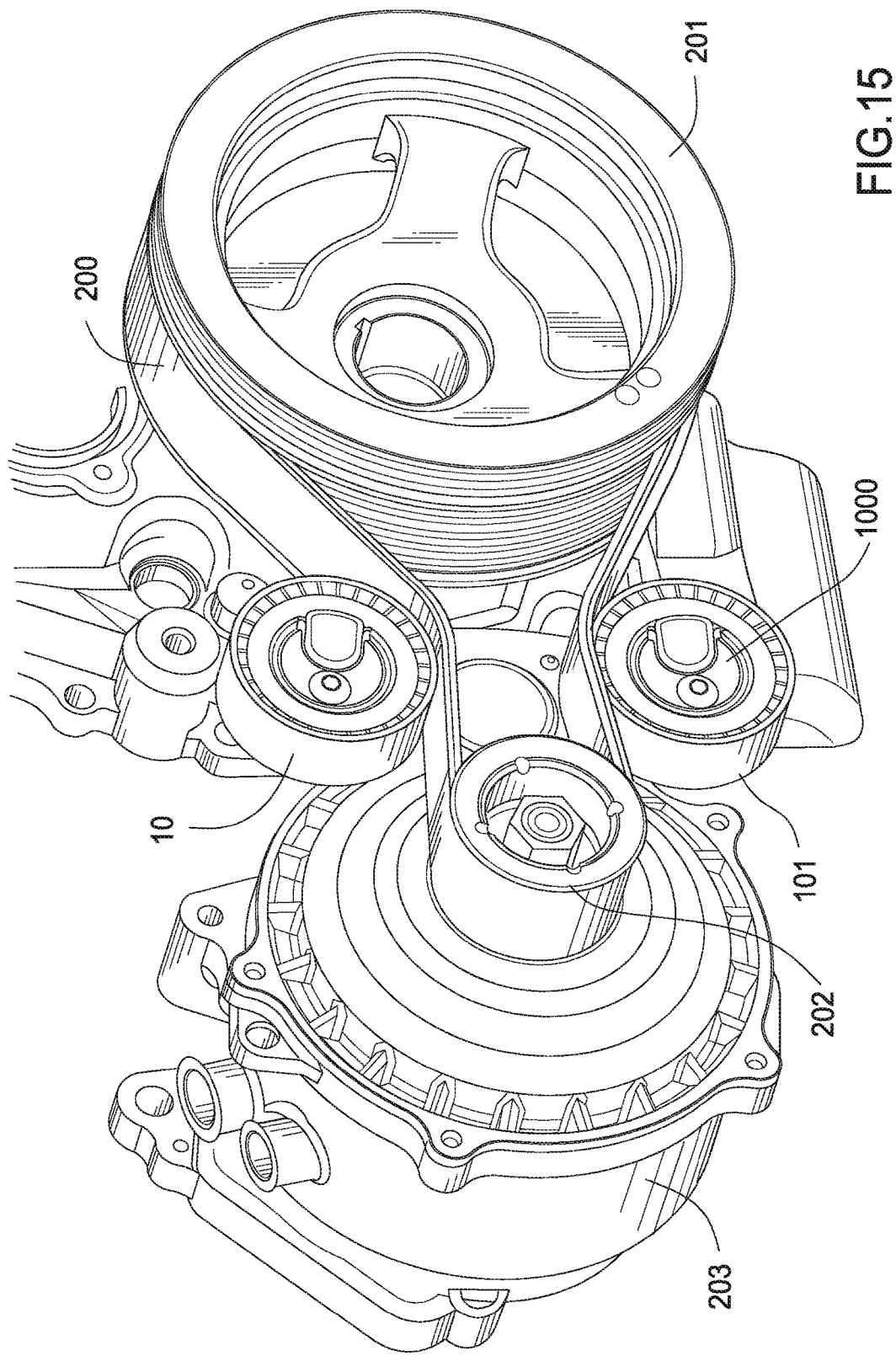
FIG. 15 is a detail of the device in an operating position on an engine.

FIG. 15 is a detail of the device in an operating position on an engine. In a typical asynchronous accessory belt drive system (ABDS) the inventive device 1000 is arranged such as shown in FIG. 15. Tensioner 1000 is mounted to the alternator 203 using fasteners 13 and 133. Belt 200 is routed around a crankshaft pulley 201, alternator pulley 202 and tensioner pulley 10 and pulley 101. This arrangement disposes the belt spans on either side of alternator pulley 202. Tension in belt 200 is maintained by operation of tensioner 1000 and the position of pulley 10 and pulley 101. Belt 200 is typically a multi-ribbed belt known in the art, namely, it comprises multiple ribs running in the longitudinal or endless direction.

The position of pivot arm 5 and thus pulley 10 is controlled by belt 8. The position of pivot arm 55 and thus pulley 101 is also controlled by belt 8. Tension in belt 8 is controlled by the position of pulley 10 and pulley 101. Tension in belt 8 is maintained by tensioner assembly 15. The span of belt 8 that engages tensioner assembly 15 is the tight side span of belt 8. The remaining span 81 of belt 8 does not require any tensioning. The tension in belt 8 creates torque on pivot arm 5 and pivot arm 55 through its engagement with sprocket 52 and sprocket 552 respectively.

Figure 16:
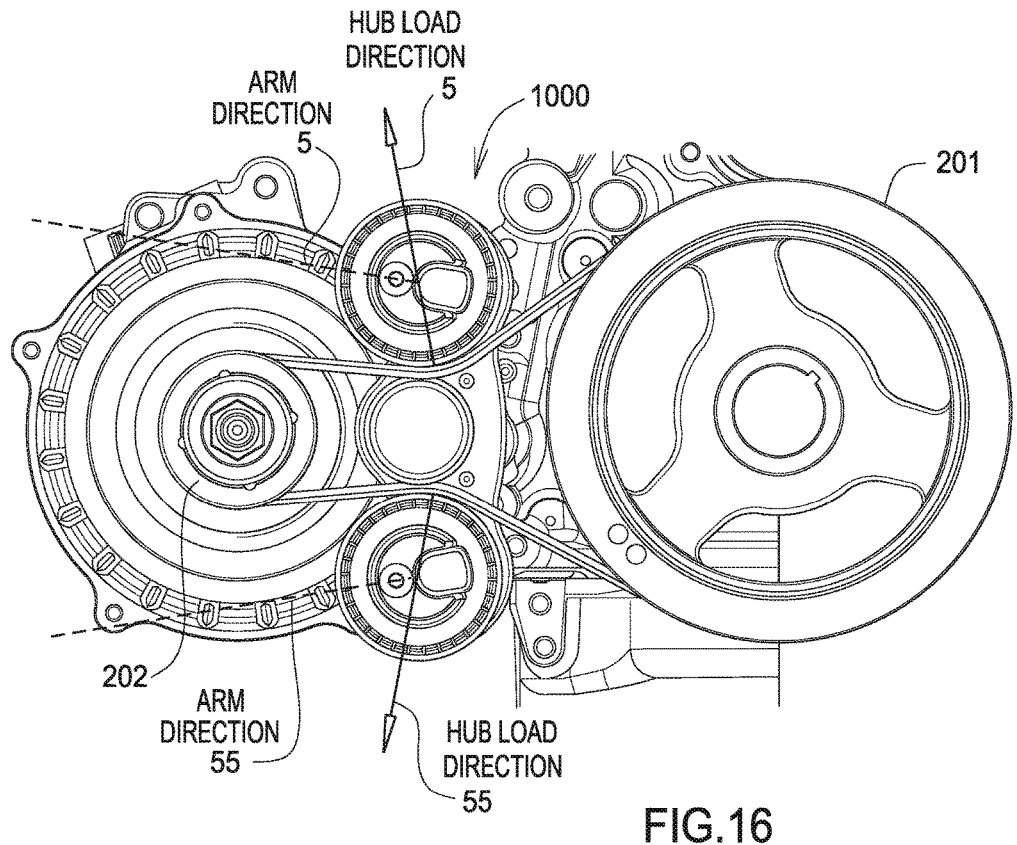
FIG. 16 shows the orientation of pivot arm 5 and pivot arm 55 and the hub load in the at rest position.

FIG. 16 shows the orientation of pivot arm 5 and pivot arm 55 and the hub load in the "at rest" position. When the engine accessory drive is in the at rest position, the tension in belt 200 is equalized throughout the belt. Tension of belt 200 in this condition is the initial belt tension and it is established by the inventive tensioner. Pivot arm 5 and pivot arm 55 are each urged to rotate into belt 200 due to the torque induced on them by the tension in belt 8 caused by tensioner assembly 15 bearing on belt 8. The tension in belt 8 causes pivot arm 5 and pivot arm to rotate until the torque is opposed equally by the torque created by the hub load from belt 200. The belt 200 hub load acts against pivot arm 5 and pivot arm 55 through the center axis of bearing 12 and bearing 102 respectively. This causes a torque to be induced on each pivot arm 5 and pivot arm 55 based on the direction of the load on the respective arm and the effective arm length. Each pivot arm 5 and pivot arm 55 will rotate until the hub load torque is equal and opposite the belt 8 torque on the respective pivot arm 5 and pivot arm 55.

The length of the moment arm from belt 8 acting on pivot arm 5 is equal to ½ the pitch diameter of sprocket 52 (for example, 26.3 mm). The length of the moment arm acting on pivot arm 5 from the belt 200 hub load is equal to the arm length times the sine of the angle of the force to the pivot arm 5 which is referred to as the effective arm length. FIG.

Figure 17A:
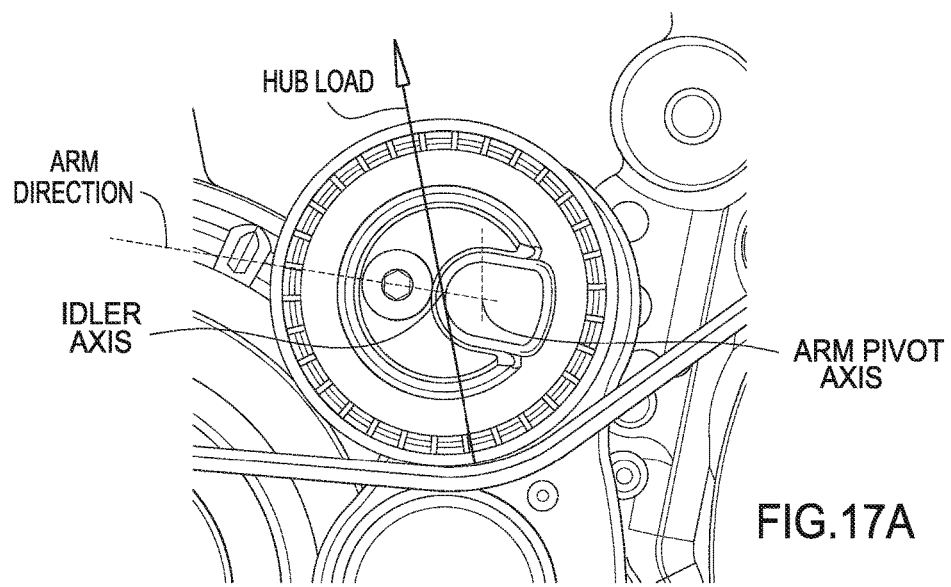
FIG. 17A is a detail of the pivot arm load conditions.
Figure 17B:
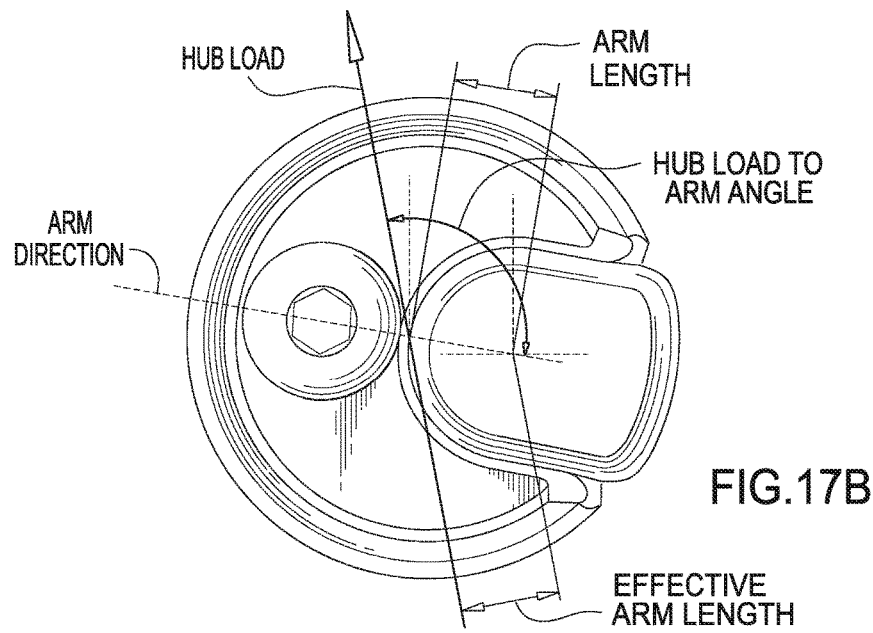
FIG. 17B is a detail of the pivot arm load conditions.

17A is a detail of the pivot arm load conditions. FIG. 17B is a detail of the pivot arm load conditions.

The length of the moment arm of belt 8 acting on pivot arm 55 is equal to ½ the pitch diameter of sprocket 552 (for example, 26.3 mm). The length of the moment arm acting on pivot arm 55 from the belt 200 hub load is equal to the arm length times the sine of the angle of the force to the pivot arm 55 which is also referred to as the effective arm length.

In a belt drive, when the torsion angle of a belt around a pulley is 60 degrees the hub load created by the tension in the belt is roughly equal to the tension in the belt. For instance, if the tension in each span of the belt is 100N, then the hub load on a pivot arm 5 would equal 100N when the torsion angle is 60 degrees.

The torque created in pivot arm 5 is then the hub load 100N times the effective arm length. If the effective arm length is 7 mm, then the torque on pivot arm 5 from the hub load is 100N×0.007 m=0.70 Nm.

The tension in belt 8 would then need to be 0.7 Nm/0.0263 m=26.6N to create an equal and opposite torque on pivot arm 5 and pivot arm 55.

As can be seen from the previous example, the tension in belt 8 need only be roughly ¼ that of the belt 200 slack side tension. This is the ratio of the effective arm length to the radius of sprocket 52 and sprocket 552.

Figure 18:
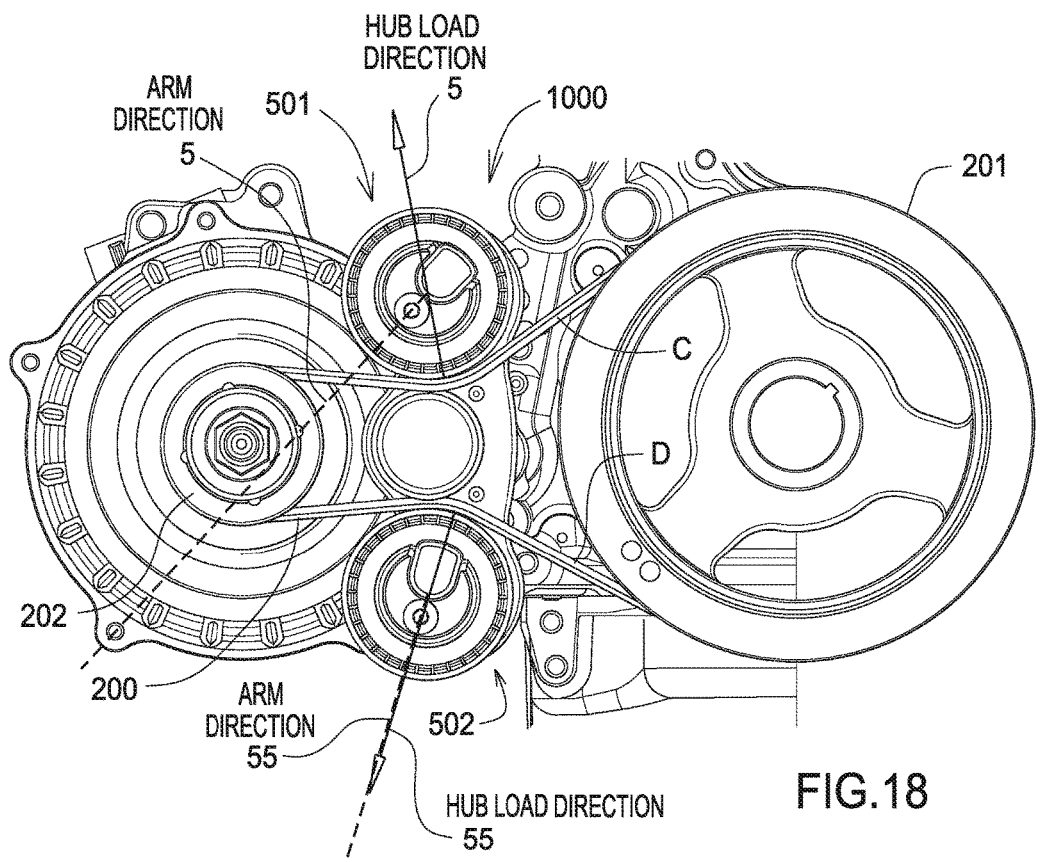
FIG. 18 shows the orientation of pivot arm 5 and pivot arm 55 and the hub load in the alternator starting mode position.

FIG. 18 shows the orientation of pivot arm 5 and pivot arm 55 and the hub load in the alternator starting mode position. During a starting event in which the alternator becomes the driver pulley in the system instead of the crankshaft, the upper span (C) in FIG. 18 becomes the slack side span and the lower belt span (D) the tight side span. If the alternator supplies 60 Nm of torque for a starting event, the tight side tension must rise to a level capable of supporting this level of power transmission. During a start event, the lower pivot arm 55 is forced to rotate by the increased tension in belt 200. The tension in belt 200 rises to a level that is sufficient to start the engine rotating, that is, driving the crankshaft.

In belt drives, the ratio of the tight side tension to the slack side tension about a pulley is known as the tension ratio. To maintain proper belt function in an ABDS drive, it is necessary that the tension ratio be approximately 5.

For a starting event requiring 60 Nm torque supplied by the alternator, the difference in tension about the alternator pulley required to create 60 Nm torque is:

$$\text{Torque}=r*\Delta T=r(T2-T1) \quad (Eq.\ 1)$$

Where T2=tight side tension
T1=slack side tension
R=pulley radius=0.030 m
solving for ΔT:

$$\Delta T=\text{Torque}/r=60/0.030=2000N$$

It is known that the slack side tension must be such that a tension ratio of 5 is maintained for proper ABDS system function. So:

$$T2/T1=5 \quad (Eq.\ 2)$$

It is known that $$\Delta T=T2-T1 (Eq.\ 3)$$

Solving for T2 in Eq. 3

$$T2=\Delta T+T1$$

Substituting into Eq. 2 and solving for T1

$$(\Delta T+T1)/T1=5$$

$$\Delta T+T1=5T1$$

$$\Delta T=4T1$$

$$\Delta T/4=T1$$

$$2000/4=T1$$

$$T1=500N$$

Substituting back into Eq. 2

$$T2/T1=5$$

$$T2/500=5$$

$$T2=2500N$$

The high tension in the tight side span (T2) (see (D) FIG. 18) during the starting event causes the hub load acting on pivot arm 55 to create a torque that causes the arm to rotate to a position where the arm direction is essentially parallel with the direction of the hub load, see FIG. 18. This has the effect of temporarily transforming tensioner assembly 502 into a fixed idler. The amount of rotation of tensioner assembly 502 pivot arm 55 is approximately 65 degrees.

The arrangement of pivot arm 5 and pivot arm 55 is such that as each rotates toward belt 200 the movement of pulley 10 and pulley 101 respectively toward the belt 200 per degree of rotation is greater than when each pivot arm rotates away from belt 200. This requires that the angle of rotation of the slack side tensioner assembly 501 be less than that moved by the tight side tensioner assembly 502 in order to maintain the same belt length. Table 1 shows the amount of rotation of each pivot arm 5 and pivot arm 55 during a starting event with no belt stretch.

TABLE 1

| Position | Belt length | Δ angle Top Arm 5 | Δ angle Bottom Arm 55 |
| --- | --- | --- | --- |
| Nominal (no load) | 884.2 mm | — | — |
| Alternator starting | 884.2 mm | 25° | 65° |

Since belt 200 stretches due to loading, the slack side pivot arm 5 must compensate for this stretch. Assuming the amount of belt stretch due to loading is 3 mm, the slack side tensioner must rotate an additional 30 degrees to take up this additional belt length. Table 2 shows the amount of rotation of each pivot arm 5 and pivot arm 55 during a starting event and includes the information taking belt stretch into account.

TABLE 2

| Position | Belt length | Δ angle Top Arm 5 | Δ angle Bottom Arm 55 |
| --- | --- | --- | --- |
| Nominal (no load) | 884.2 mm | — | — |
| Alternator start (no stretch) | 884.2 mm | 25° | 65° |
| Alternator start (with stretch) | 887.2 mm | 55° | 65° |

As can be seen in Table 2, the slack side tensioner pivot arm 5 must rotate an additional 30 degrees to account for the stretch of belt 200. FIG. 22A illustrates pivot arm position during an operating condition. FIG. 22B illustrates pivot arm position during an operating condition. FIG. 22C illustrates pivot arm position during an operating condition. FIG. 22D illustrates pivot arm position during an operating condition.

Additionally, the arrangement is such that the slack side pivot arm 5 effective arm length is reduced as it moves toward belt 200. This reduction in effective arm length enables the inventive device to increase slack side tension and thus increase the overall belt 200 tension during events such as alternator starting. This is accomplished because the tension in belt 8 is controlled via the tensioner assembly 15. Tensioner assembly 15 induces a torque on pivot arm 5 that must be opposed by the hub load of belt 200 as previously described. Fifty-Five degrees of rotation of the slack side pivot arm 5 reduces its effective arm length from 7 mm to 4.2 mm.

Since tensioner assembly 15 controls the tension in belt 8 and thereby belt 200, it controls the torque in pivot arm 5. The rotation angle of pivot arm 5 is less than the rotation angle of pivot arm 55 by 10 degrees. This effectively shortens the span of belt 8 acting upon tensioner assembly 15, thereby causing rotation of tensioner assembly 15. The rotation of tensioner assembly 15 causes the tension in belt 8 to increase. Increasing tension in belt 8 increases the torque on pivot arm 5 and pivot arm 55. The hub load force creating the opposing torque on pivot arm 5 and pivot arm 55 must increase to reach equilibrium.

To calculate the tension on belt 200 which is approximately equal to the hub load as previously shown, one simply divides the torque on pivot arm 5 from belt 8 by the new effective arm length. The new tension in belt 8 is 81N. The torque on pivot arm 5 from belt 8 is 2.13 Nm. The tension in belt 200 is 2.13 Nm/0.0042 m=507N. This tension is above the minimum slack side tension (T1) calculated earlier and creates the proper overall belt tension. The inventive device's ability to increase slack side tension is advantageous in that it allows overall initial tensions to be reduced which is beneficial for belt life and accessory life.

Hence, for a 60 Nm starting event, the inventive device provides the minimum 500N slack side tension. For a 60 Nm regenerative braking event, the inventive device provides the minimum 500N slack side tension. For no load situations, the inventive device provides reduced slack side tension of 100N. For medium load situations such as 20 Nm alternator load, the inventive device provides the necessary slack side tension of 167N.

Please note that all numeric values used in this description are only examples used for the purpose of illustration and are not intended to limit the scope of the invention.

Damping belt vibration is also an important function of tensioners. Damping is most often accomplished by creating resistance to movement in the tensioner pivot arm. It is generally considered advantageous to have asymmetric damping in ABDS tensioners. Asymmetric damping is a condition where resistance to tensioner arm movement differs depending on the direction of tensioner pivot arm movement.

Figure 19:
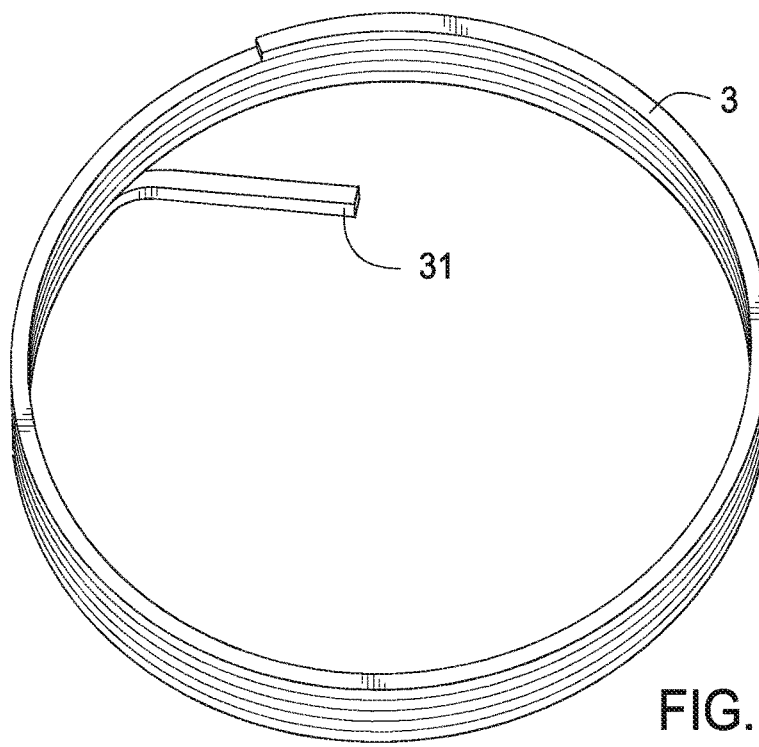
FIG. 19 is a detail of a clutch spring.
Figure 20:
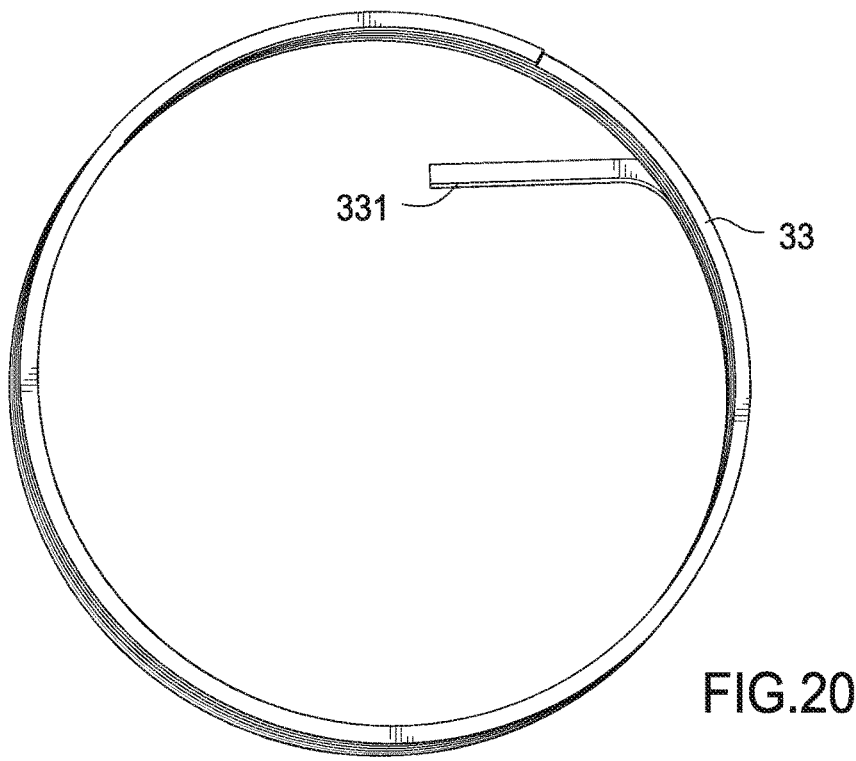
FIG. 20 is a detail of a clutch spring.
Figure 21:
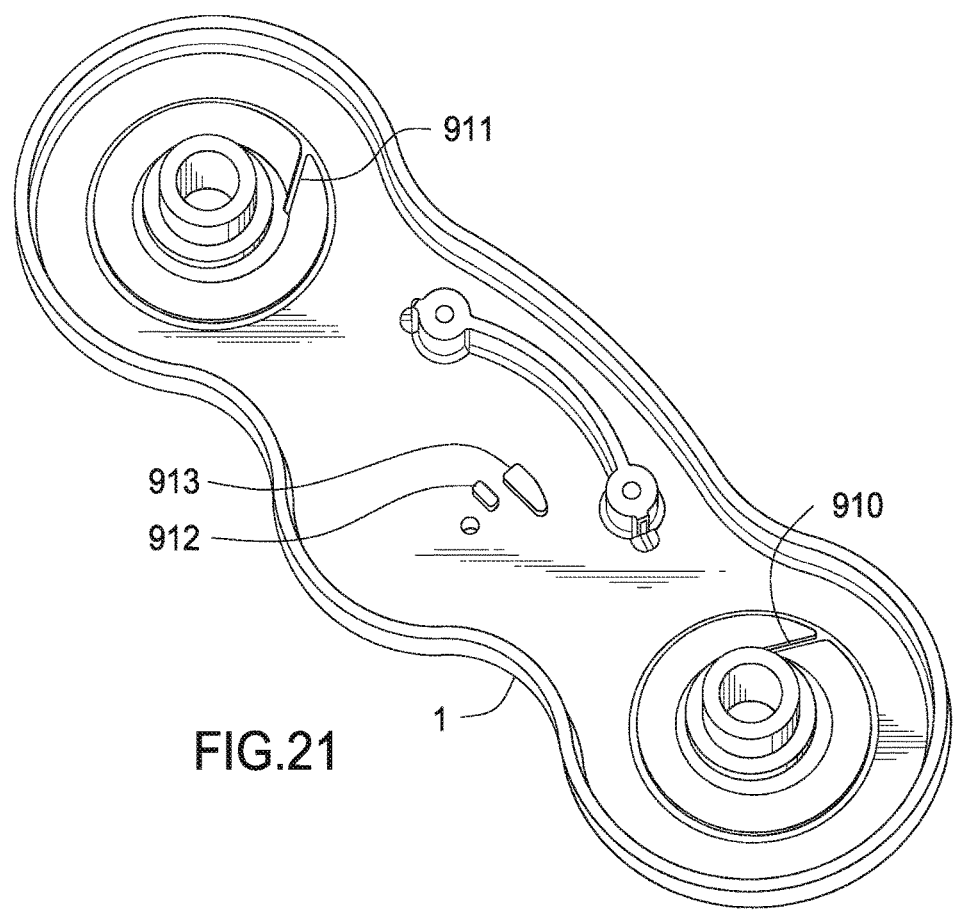
FIG. 21 is a detail of the base.

FIG. 19 is a detail of a clutch spring. FIG. 20 is a detail of a clutch spring. Damping in the inventive tensioner is created through the interaction of damping assembly 4 with clutch spring 3 and pivot arm 5, and by interaction of damping assembly 44 with clutch spring 33 and pivot arm 55. Clutch spring 3 is a right hand wind and clutch spring 33 is a left hand wind. Clutch spring 3 is attached to base 1 through the engagement of tang 31 into slot 911. Clutch spring 33 is attached to base 1 through the engagement of tang 331 into slot 910, see FIG. 21. FIG. 21 is a detail of the base.

Clutch spring 3 acts as a one way clutch against damping assembly 4. Clutch spring 3 limits damping assembly 4 so it will only rotate freely in the direction in which the pivot arm 5 rotates toward the belt 200. Damping assembly 4 is configured such that damping shoe 41 creates outward pressure on damping ring 42 which in turn is forced outward into contact with damping surface 51 of pivot arm 5. The normal force created by this outward pressure combines with the friction coefficient of damping ring 42 on the pivot arm 5 to create a frictional force resisting movement between damping assembly 4 and pivot arm 5. The friction force causes damping assembly 4 to urge pivot arm 5 to rotate whenever damping assembly 4 rotates.

Clutch spring 33 acts as a one way clutch against damping assembly 44. Clutch spring 33 limits damping assembly 44 so it will only rotate freely in the direction in which pivot arm 55 rotates toward the belt 200. Damping assembly 44 is configured such that damping shoe 441 creates outward pressure on damping ring 442 which in turn is forced outward into contact with damping surface 551 of pivot arm 55. The normal force created by this outward pressure combines with the friction coefficient of damping ring 442 on pivot arm 55 to create a frictional force resisting movement between the damping assembly 44 and pivot arm 55. The friction force causes damping assembly to cause pivot arm 55 to rotate whenever damping assembly 44 rotates.

During vehicle operation in which the tight span of belt 200 is engaged with tensioner assembly 15, as belt 200 tension increases, the torque exerted by the hub load on pivot arm 5 increases causing pivot arm 5 to rotate away from belt 200. During this movement away from belt 200, clutch spring 3 locks against damping assembly 4 eliminating the ability of damping ring 4 to rotate with pivot arm 5, which stops pivot arm 5 from rotating. Pivot arm 5 can then only rotate after the torque caused by the increasing hub load exceeds the resistance from damping assembly 4. In addition, the tension in the slack side span of belt 200 drops and the respective pivot arm 55 moves into belt 200. Since in this direction of rotation the clutch spring 33 clutch releases, pivot arm 55 freely rotates and thereby maintains proper slack span belt tension.

During vehicle operation in which the tight span is against tensioner assembly 502, as belt 200 tension increases, the torque exerted by the hub load on pivot arm 55 increases causing the arm to rotate away from belt 200. During this movement away from belt 200, clutch spring 33 locks against damping assembly 44 eliminating the ability of damping assembly 44 to rotate with pivot arm 55, thereby stopping pivot arm 55. Pivot arm 55 can only rotate after the torque caused by the increasing hub load exceeds the resistance from damping assembly 44. In addition, the tension in the slack side span of belt 200 drops and the respective pivot arm 5 moves into belt 200. Since in this direction of rotation the clutch spring 3 clutch releases pivot arm 5, pivot arm 5 freely rotates and thereby maintains proper slack span belt tension in belt 200.

The rotational resistance of pivot arm 5 caused by damping assembly 4 acting with clutch spring 3 creates a greater resistance to movement in one direction than the other. The unequal resistance to rotation creates asymmetric damping in tensioner assembly 501.

The rotational resistance of pivot arm 55 caused by damping assembly 44 acting with clutch spring 33 creates greater resistance to movement in one direction than the other. This unequal resistance to rotation creates asymmetric damping in tensioner assembly 502.

BAS systems also operate in normal modes in which the alternator loads the crankshaft pulley through belt 200, for example, when the alternator is generating electrical power.

BAS systems also operate in modes in which the alternator is used to highly load the crankshaft pulley and in turn assist vehicle breaking, also referred to as regenerative braking. In regenerative braking events the loading of the belt is opposite of that described above in the alternator starting event. In this case the function of the inventive tensioner is merely switched such that the tight span of belt 200 bears on tensioner assembly 501 and the slack side span of belt 200 bears on tensioner assembly 502.

Further embodiments include, but are not limited to, sprocket 52 and sprocket 552 are each individually or in combination, non-circular in shape. Each sprocket 52 and sprocket 552 can be non-coaxial with pivot arm 5 and pivot arm 55 pivot axis respectively. Sprocket 52 and sprocket 552 can be eccentric to pivot arm 5 and pivot arm 55 and each can have a different offset respectively. Pivot arm 5 can have a different eccentric offset from pivot arm 55. Sprocket 52 and sprocket 552 can be different diameter. Belt 8 need not be an endless plurality of evenly spaced teeth, namely, belt 8 can have ends wherein span 81 is not present. Belt 8 need not be an endless plurality of evenly spaced teeth but rather only needs to be toothed at the interface with sprocket 52 and sprocket 552. Belt 8 can be a flexible endless member such as a flat belt, strap, rope or cable capable of carrying a tensile load. Belt 8 can be a rigid bar hinged near tensioner assembly 15. Belt 8 can be replaced by a compressible member representing span 81 of belt 8.

Figure 26:
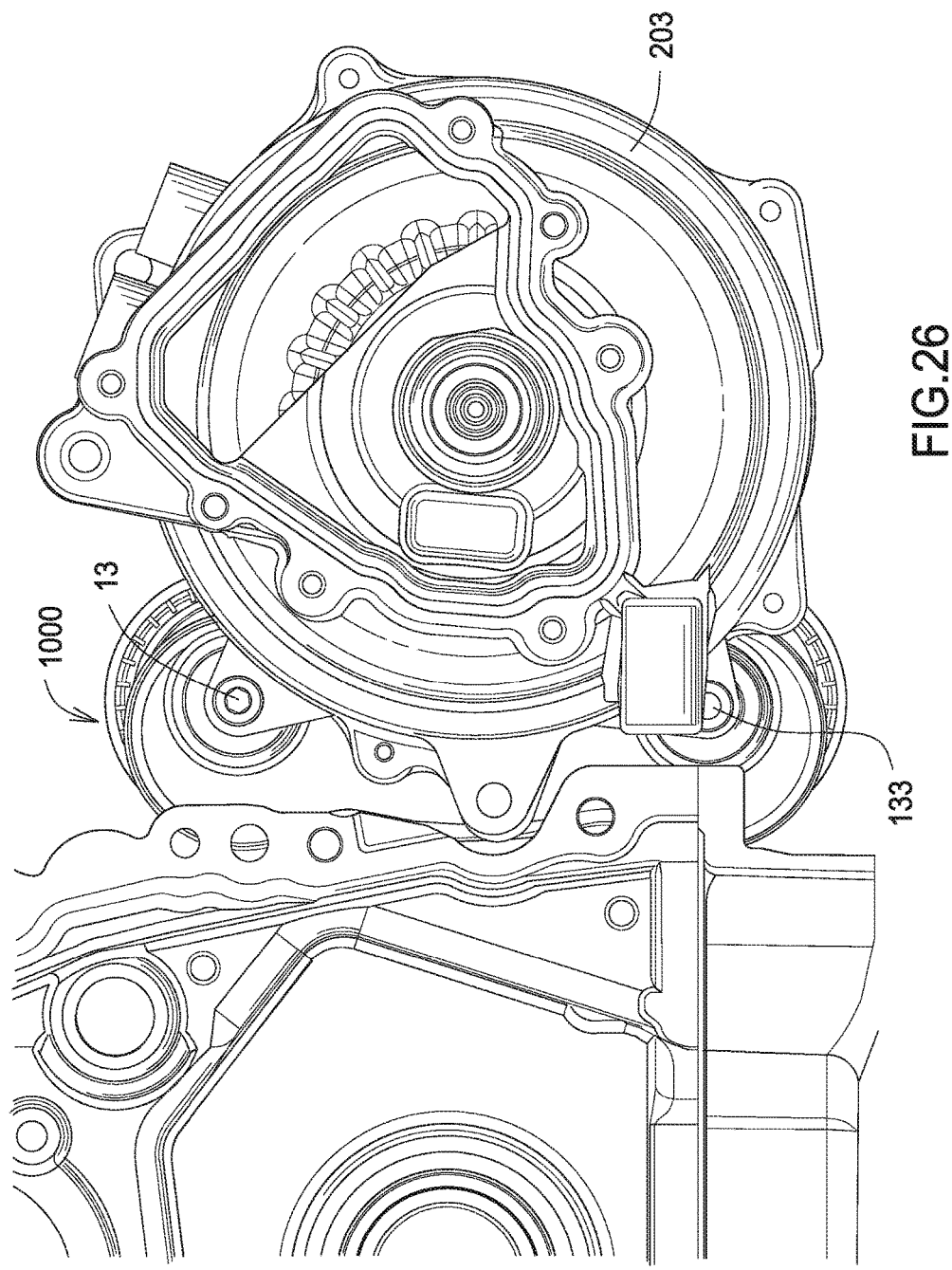
FIG. 26 is a rear detail of the tensioner mounted to the alternator.

FIG. 26 is a rear detail of the tensioner mounted to the alternator. Fastener 13 and fastener 133 are used to attach the tensioner 1000 to an alternator 203.

Figure 27:
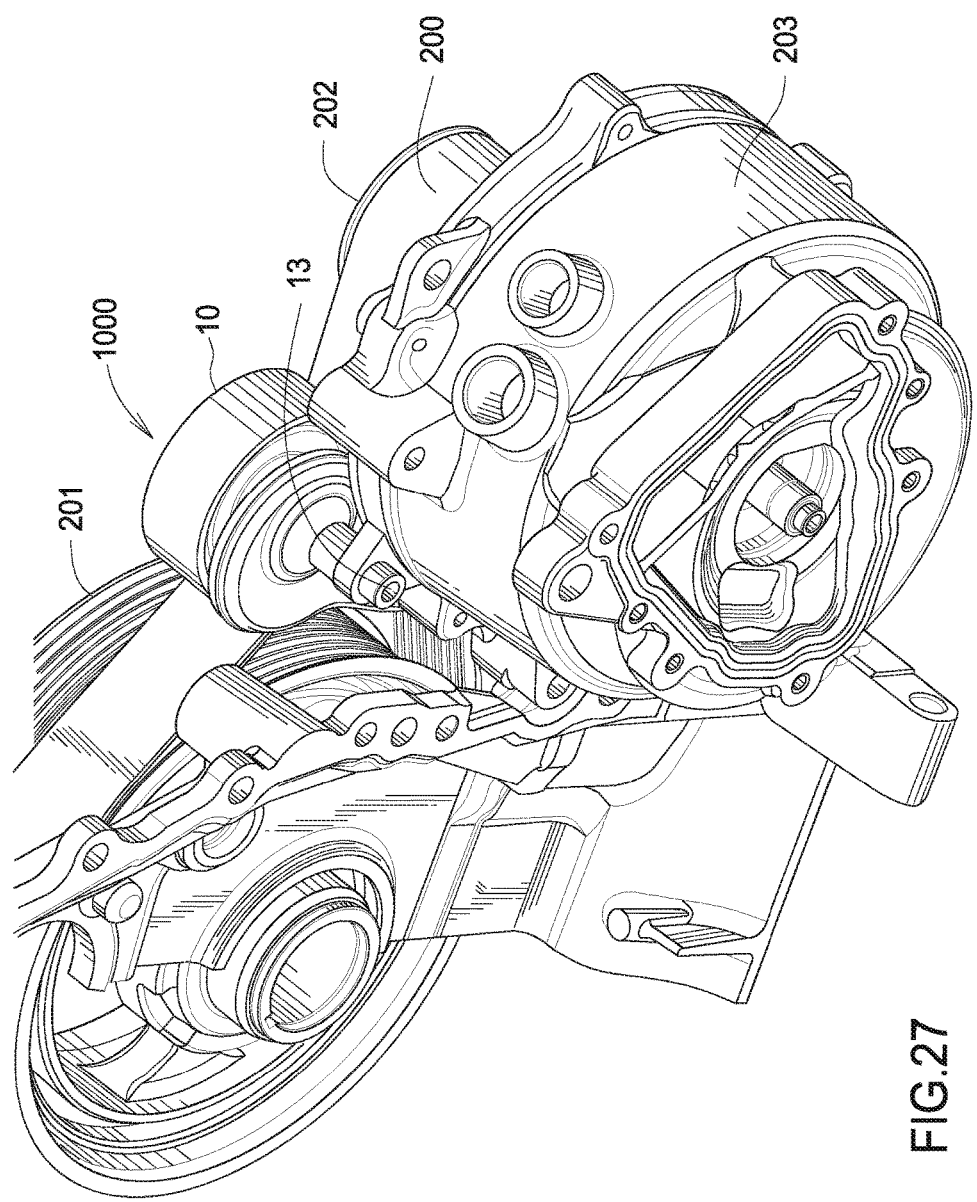
FIG. 27 is a rear top view detail of the tensioner mounted to the alternator.

FIG. 27 is a rear top view detail of the tensioner mounted to the alternator.

Figure 28:
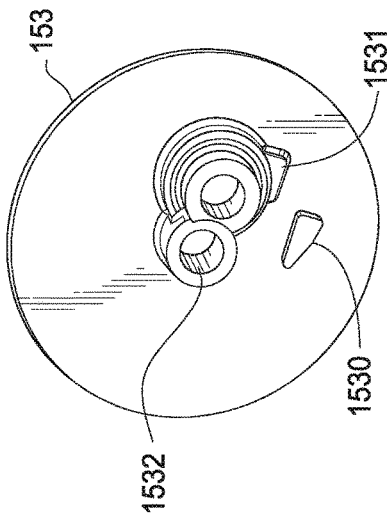
FIG. 28 is a bottom view of the tensioner arm.

FIG. 28 is a bottom view of the tensioner arm. End 1541 of spring 154 engages between tab 1530 and tab 1531 on pivot arm 153.

Figure 29:
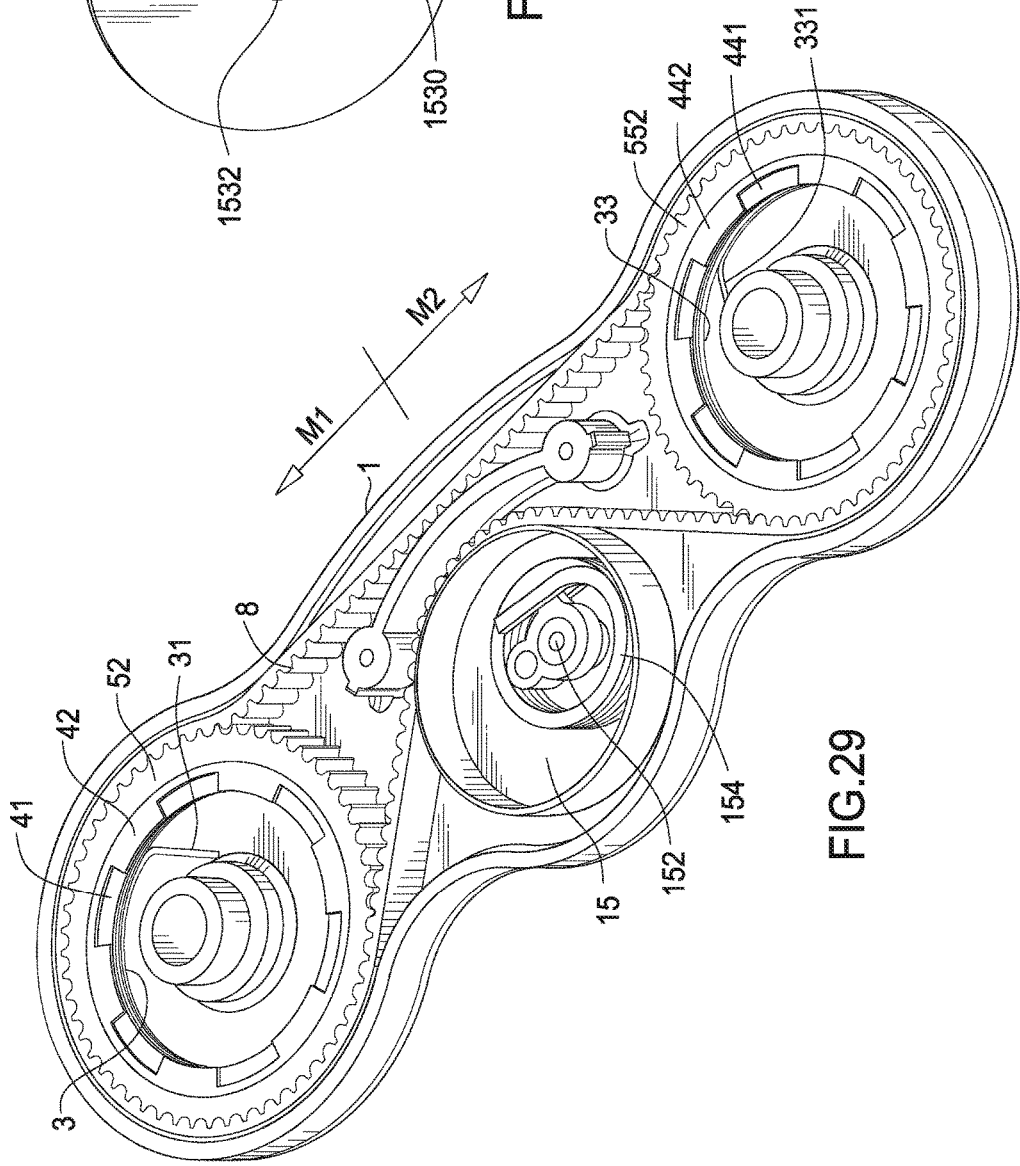
FIG. 29 is a perspective view of section 29-29 from FIG. 2.

FIG. 29 is a perspective view of section 29-29 in FIG. 2. Damping assembly 4 frictionally engages surface 51 of pivot arm 5. Damping assembly 44 frictionally engages surface 551 of pivot arm 55. Clutch spring 3 frictionally engages damping shoe 41. Clutch spring 33 frictionally engages damping shoe 441. Clutch spring 3 and clutch spring 33 are each loaded in the unwinding direction, which means the diameter of each expands as the imparted load increases. Expansion of clutch spring 3 presses damping shoe 41 against damping ring 42 which in turn presses against surface 51, which slows or stops rotation of pivot arm 5. Expansion of clutch spring 33 presses damping shoe 441 against damping ring 442 which in turn presses against surface 551, which slows or stops rotation of pivot arm 55.

For example, if belt 8 moves in direction (M1), clutch spring 3 will be loaded in the winding direction and therefore will not resist rotation of pivot arm 5. However, clutch spring 33 will be loaded in the unwinding direction and therefore damping assembly 44 will resist rotation of pivot arm 55.

If belt 8 moves in direction (M2), clutch spring 3 will be loaded in the unwinding direction and therefore will resist rotation of pivot arm 5. However, clutch spring 33 will be loaded in the winding direction and therefore damping assembly 44 will not resist rotation of pivot arm 55.

Tensioner assembly 15 will maintain load in belt 8 regardless of the direction of movement of belt 8. Tensioner assembly 15 will maintain load in belt 200 through each pivot arm 5 and pivot arm 55 regardless of the direction of movement of belt 200.

Figure 30:
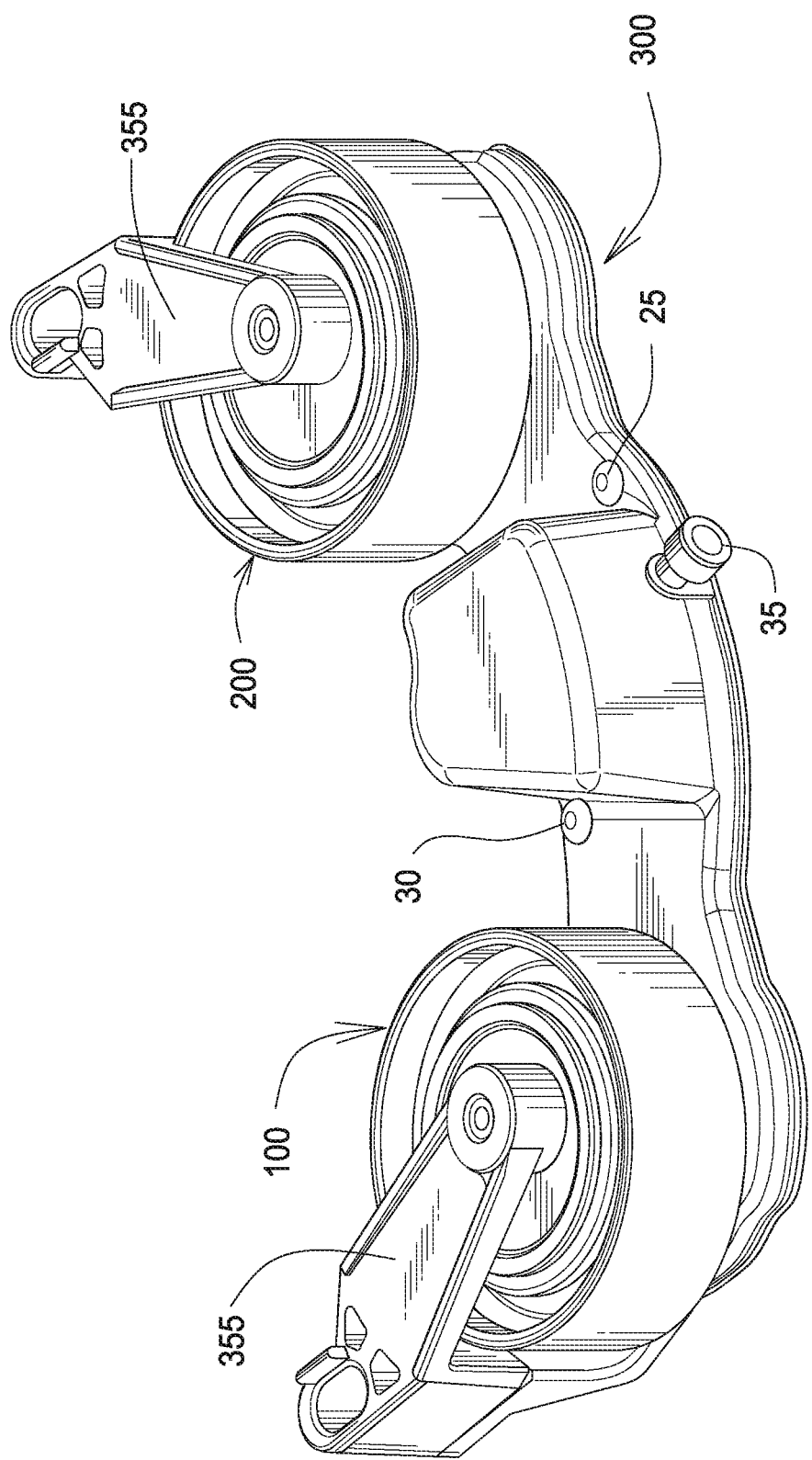
FIG. 30 is a perspective view of an alternate embodiment.

FIG. 30 is a perspective view of an alternate embodiment. The alternate embodiment comprises idler assembly 100 and idler assembly 200, each pivotally engaged with base 300. Tensioner assembly 340 is pivotally mounted to base 300. Adjuster 35 is used to adjust a position of tensioner assembly 340. Each idler assembly 100, 200 pivots eccentrically about its respective pivot axis. The pivot axis for idler assembly 100 is post 3310. The pivot axis for idler assembly 200 is post 3315, see FIG. 47.

Figure 31:
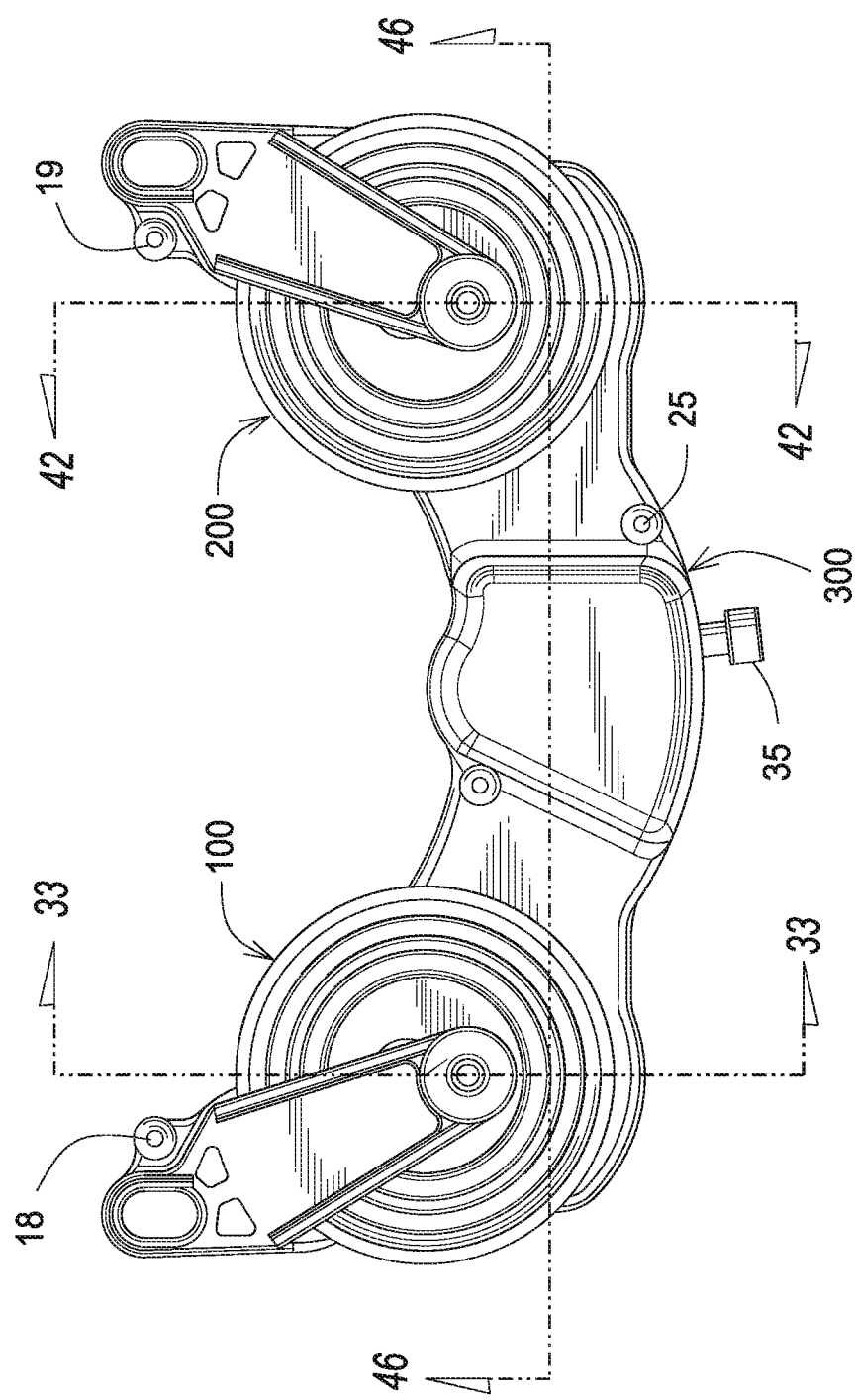
FIG. 31 is a plan view of the embodiment in FIG. 30.

FIG. 31 is a plan view of the embodiment in FIG. 30.

Figure 32:
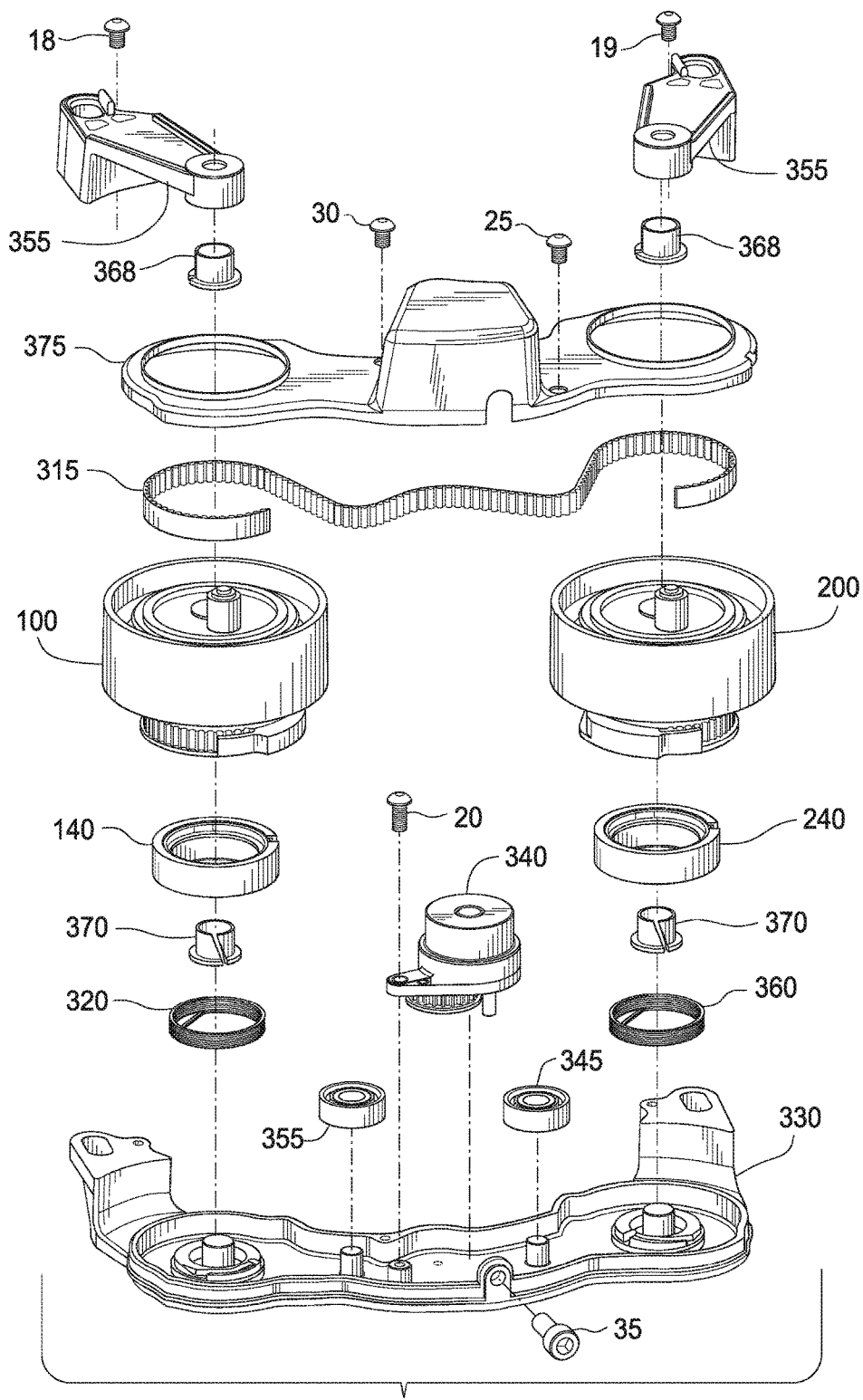
FIG. 32 is an exploded view of the embodiment in FIG. 30.

FIG. 32 is an exploded view of the embodiment in FIG. 30. Adjuster member 35 adjusts the load by which tensioner 340 engages belt 315. Each retainer 355 holds each respective idler assembly 100, 200 in its proper position. Damping mechanism 140 is disposed between assembly 100 and base 300. Damping mechanism 240 is disposed between assembly 200 and base 300. A torsion spring 320, 360 is engaged between each respective idler assembly 100, 200 and base 300. Each spring 320, 360 acts as a one-way clutch engaging damping mechanism 140, 240 and base 300.

Bushing 368 is engaged between each retainer 355 and assembly 100 and 200. Fasteners 18, 19, 20, 25 and 30 attach cover 375 to base 300. Bushing 370 is engaged between the base 300 and each assembly 100, 200.

Flexible member 315 does not comprise an endless length, meaning, it has discrete ends. Each end of member 315 is attached to a lower eccentric arm 130, 230, respectively.

Figure 33:
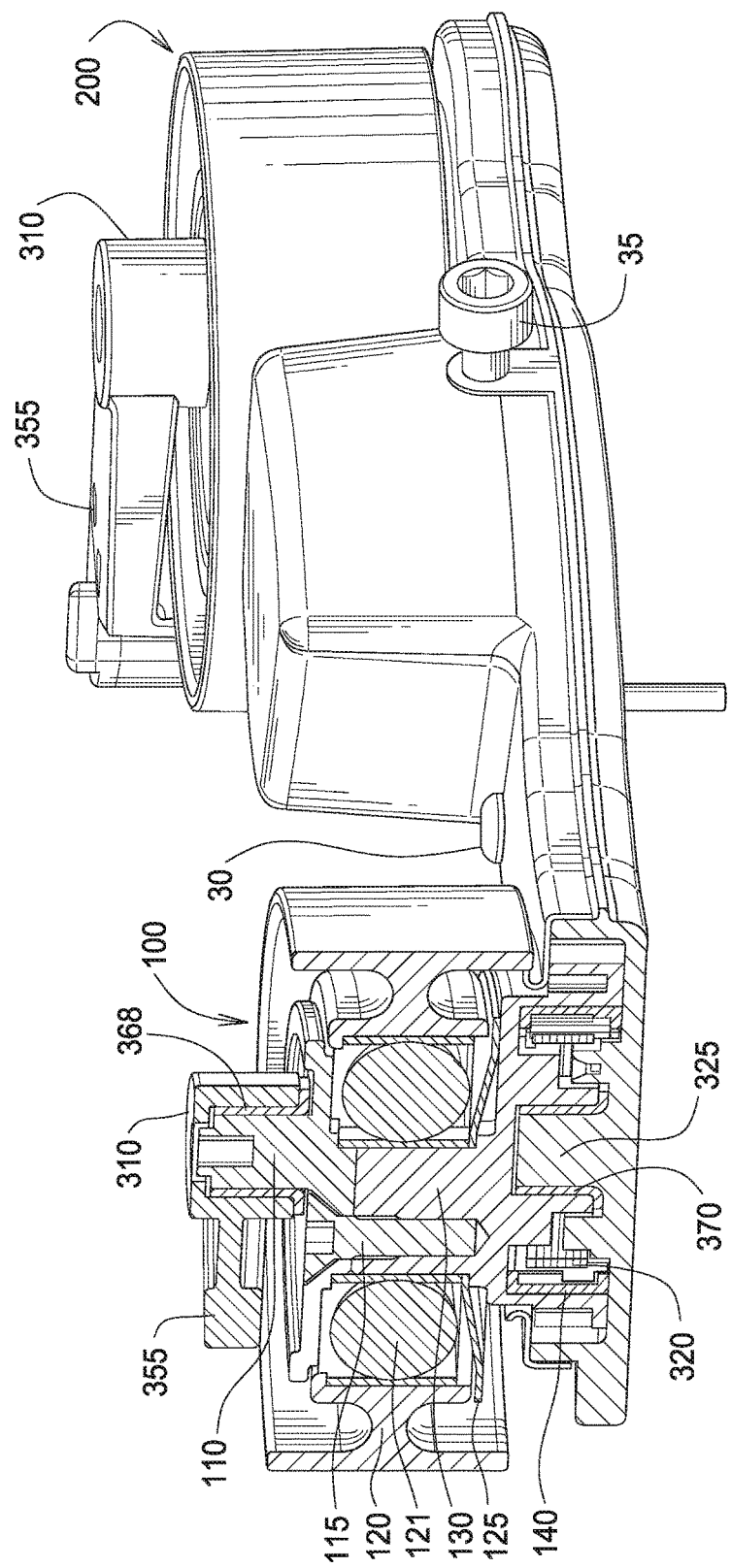
FIG. 33 is cross-sectional view of the embodiment in FIG. 30.

FIG. 33 is cross-sectional view of the embodiment in FIG. 31. Eccentric idler assembly 100 comprises upper eccentric arm 110, fastener 115, idler assembly 120, dust shield 125, lower eccentric arm 130, spring 320, and damping mechanism 140. Fastener 115 connects upper arm 110 to lower arm 130. Bushing 368 engages upper arm 110. Bushing 370 engages lower arm 130.

Idler assembly 120 and dust shield 125 are coaxial with eccentric axis 1320. Damping mechanism 140 is coaxial with pivot axis 1310. Eccentric axis 1120 is coaxial with eccentric axis 1320. Pivot axis 1110 is coaxial with pivot axis 1310.

Figure 34:
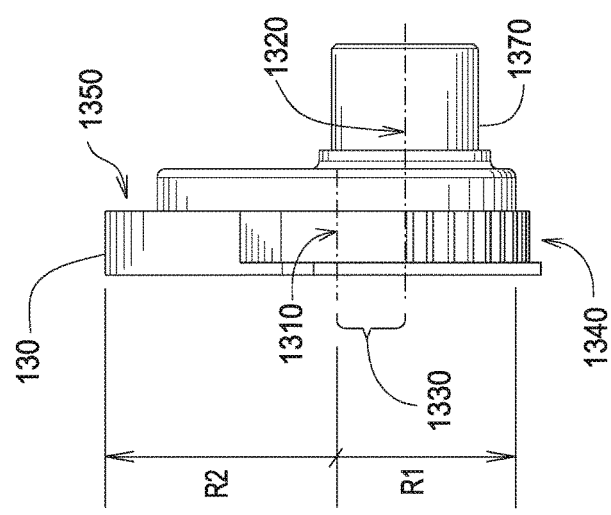
FIG. 34 is a side view of an eccentric arm cam.

FIG. 34 is a side view of an eccentric arm cam. The idler assembly comprises a lower eccentric arm 130. Arm 130 comprises a pivot axis 1310, an eccentric axis 1320, toothed portion 1340, cam portion 1350 and tang 1360. Eccentric axis 1320 and pivot axis 1310 are not coaxial and instead are offset by distance 1330. Portion 1370 engages bearing 121. The radius R1 of toothed portion 1340 is less than the radius R2 of the cam portion 1350. Belt 315 is progressively engagable with cam portion 1350 as arm 130 pivots.

Figure 35:
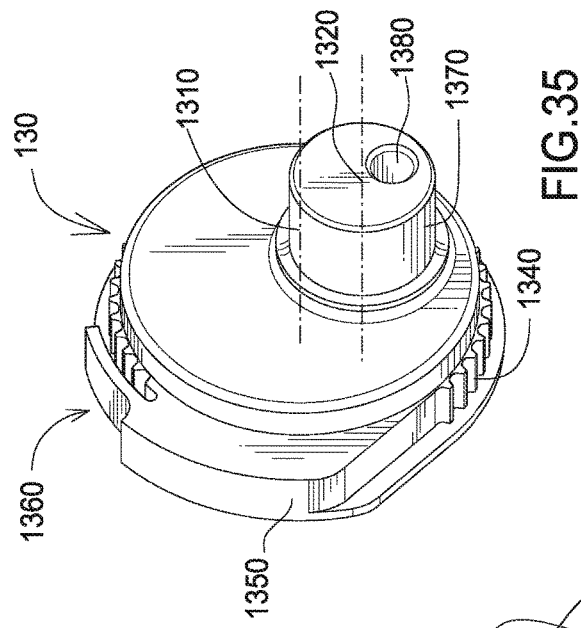
FIG. 35 is a perspective view of the arm in FIG. 34.

FIG. 35 is a perspective view of the arm in FIG. 34. Arm 130 comprises tang 1360. One end of belt 315 is captured with tang 1360. Threaded hole 1380 receives fastener 115.

Figure 37:
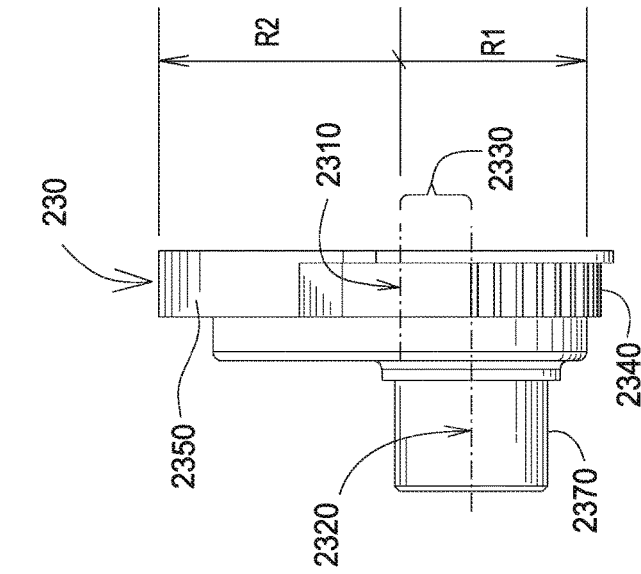
FIG. 37 is a side view of an eccentric arm cam.
Figure 36:
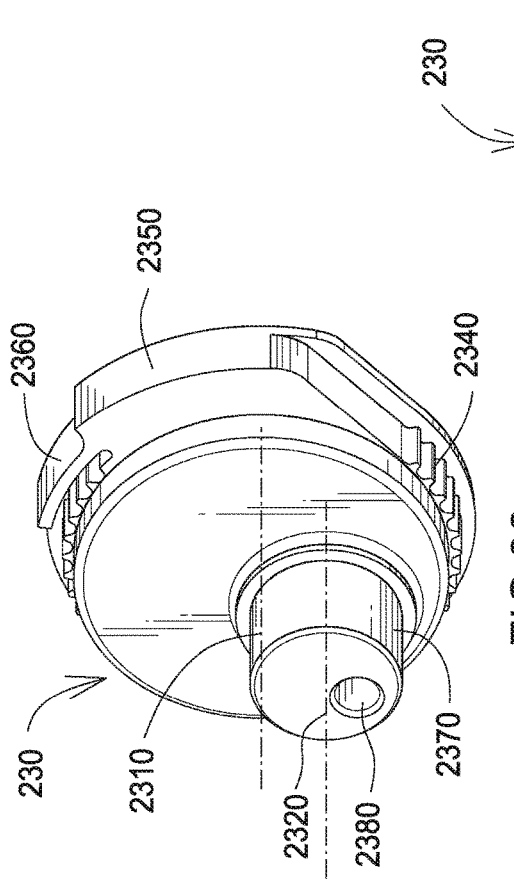
FIG. 36 is a perspective view of the arm in FIG. 37.

FIG. 36 is a perspective view of the arm in FIG. 37. Lower arm 230 comprises tang 2360. The other end of belt 315 is engaged with tang 2360. Portion 2370 engages bearing 221. Threaded hole 2380 receives fastener 215.

FIG. 37 is a side view of an eccentric arm cam. The idler assembly comprises a lower eccentric arm 230. Arm 230 comprises a pivot axis 2310, an eccentric axis 2320, toothed portion 2340, cam portion 2350 and tang 2360. Eccentric axis 2320 and pivot axis 2310 are not coaxial and instead are offset by distance 2330. Radius R1 of toothed portion 2340 is less than radius R2 of the cam portion 2350. Belt 315 is progressively engagable with cam portion 2350 as arm 230 pivots.

Figure 38:
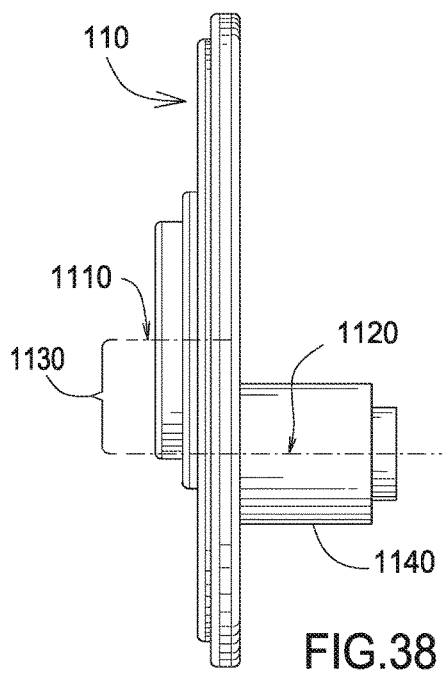
FIG. 38 is a side view of an eccentric upper arm.

FIG. 38 is a side view of an eccentric upper arm. Upper eccentric arm 110 comprises a pivot axis 1110 and eccentric axis 1120. Axis 1110 and 1120 are not coaxial and instead are offset by distance 1130. Portion 1140 pivotally engages retainer 355 through busing 368.

Figure 39:
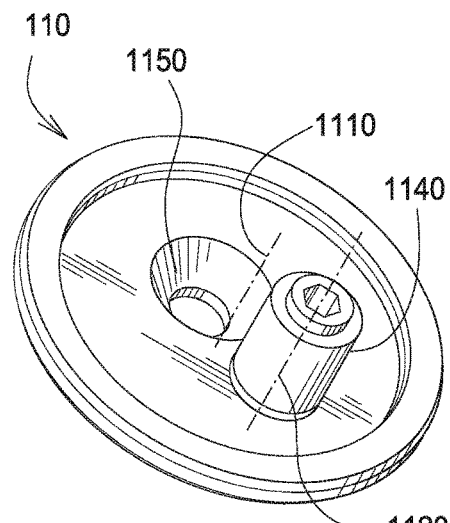
FIG. 39 is a perspective view of the arm in FIG. 38.

FIG. 39 is a perspective view of the arm in FIG. 38. Recess 1150 receives fastener 115.

Figure 40:
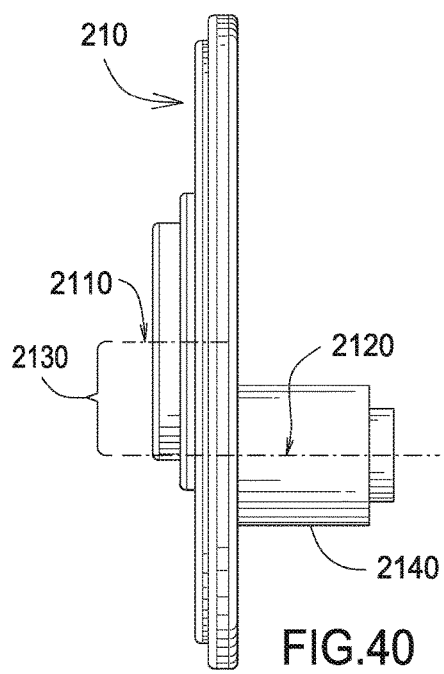
FIG. 40 is a side view of an eccentric upper arm.

FIG. 40 is a side view of an eccentric upper arm. Upper eccentric arm 210 comprises a pivot axis 2110 and eccentric axis 2120. Axis 2110 and 2120 are not coaxial and are offset by distance 2130. Portion 2140 pivotally engages retainer 355 through bushing 368.

Figure 41:
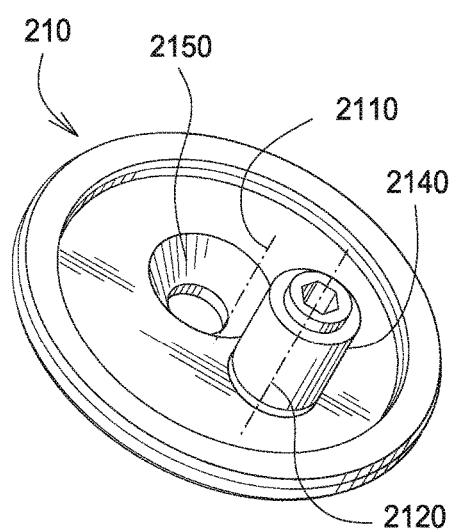
FIG. 41 is a perspective view of the arm in FIG. 40.

FIG. 41 is a perspective view of the arm in FIG. 40. Recess 2150 receives fastener 215.

Figure 42:
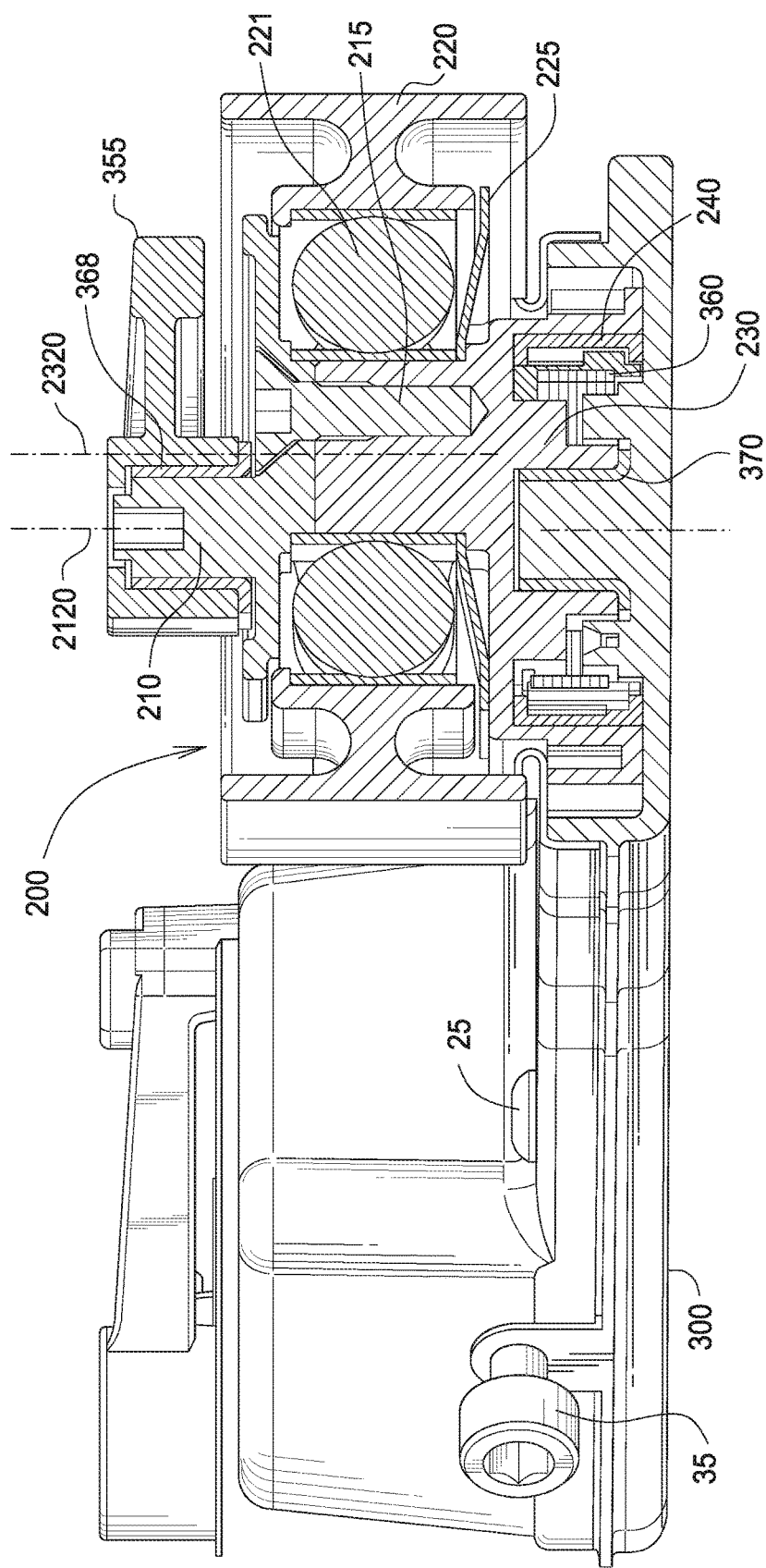
FIG. 42 is a side cross section of the embodiment in FIG. 31.

FIG. 42 is a side cross section of the embodiment in FIG. 31. Eccentric idler assembly 200 comprises upper eccentric arm 210, fastener 215, idler assembly 120, dust shield 225, lower eccentric arm 230, damping mechanism 240 and spring 360. Fastener 215 connects arm 210 to arm 230. Upper arm 210 engages retainer 355 through bushing 368.

Idler assembly 220 and dust shield 225 are coaxial with eccentric axis 2320. Damping mechanism 240 is coaxial with pivot axis 2310. Eccentric axis 2120 is coaxial with eccentric axis 2320. Pivot axis 2110 is coaxial with pivot axis 2310.

Figure 43:
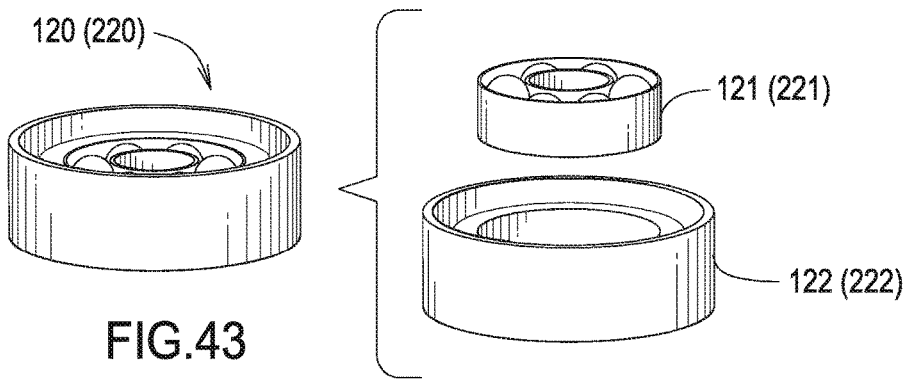
FIG. 43 is a detail of an idler assembly.

FIG. 43 is a detail of an idler assembly. Idler assembly 120 comprises bearing 121 and idler 122. Idler assembly 220 comprises bearing 221 and idler 222. Idler assembly 120 and 220 are identical in form and function.

Figure 44:
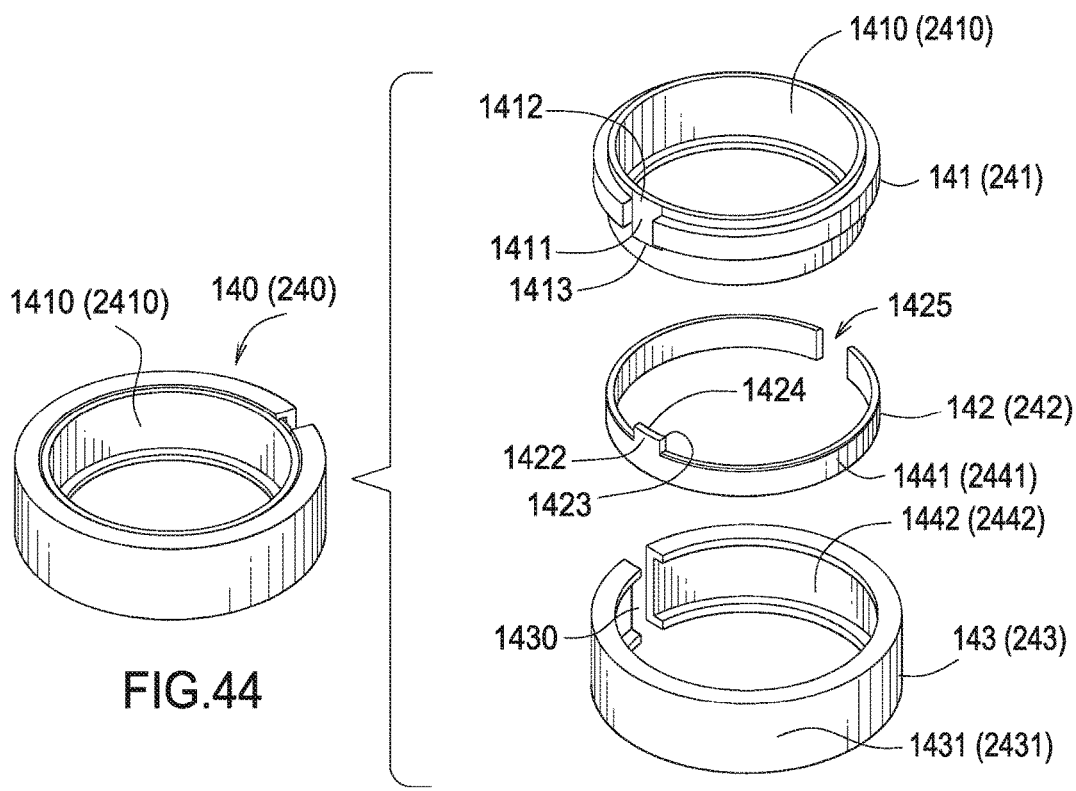
FIG. 44 is a detail of the damping mechanism for the embodiment in FIG. 30.

FIG. 44 is a detail of the damping mechanism for the embodiment in FIG. 30. Damping mechanism 140 comprises transfer ring 141, damping shoe 142 and damping ring 143. Transfer ring 141 is cylindrical with an inner surface 1410, slot 1411, face 1412 and face 1413, see FIG. 45. Damping shoe 142 is cylindrical with a gap 1425 running axially and tab 1424 protruding axially. Tab 1424 comprises face 1422 opposing face 1423. Damping ring 143 is cylindrical with a gap 1430 running axially. Damping ring 143 and damping shoe 142 are coaxial with transfer ring 141. Face 1413 opposes face 1423. Face 1412 opposes face 1422.

Figure 35A:
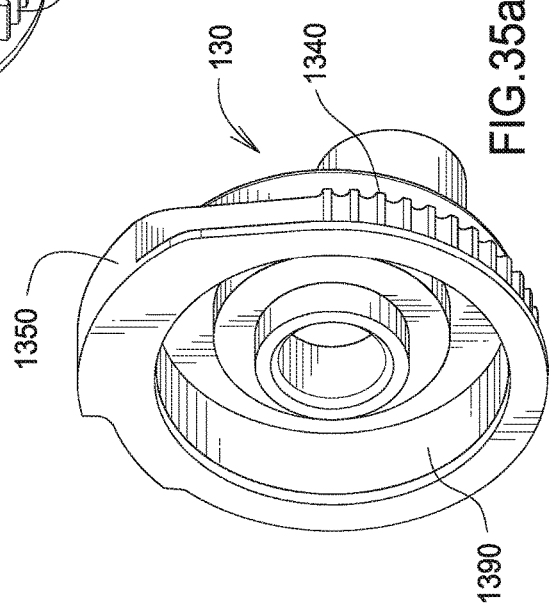
FIG. 35a is a perspective view of the arm in FIG. 34.

Face 1410 frictionally engages spring 320. Outward surface 1431 of damping ring 143 frictionally engages inward surface 1390 of lower eccentric arm 130, see FIG. 35a. Damping shoe 142 acts in a spring like manner pushing outside surface 1441 outward against inward surface 1442 and thus forces surface 1431 outward against surface 1390. The outward spring force creates the normal force for frictional engagement of damping mechanism 140 to arm 142. When arm 142 rotates into the belt 200, spring 320 clutches and disengages damping mechanism 140. Arm 142 is free to rotate toward belt 200. When arm 142 rotates away from belt 200, the outer surface of spring 320 radially expands in the unwinding direction thereby clutching and engaging surface 1410 of damping mechanism 140. Rotation of arm 142 is resisted by the frictional engagement of damping mechanism 140 with arm 142.

Damping mechanism 240 is identical in form and function to damping mechanism 140. The corresponding numbers for damping mechanism 240 are noted in parenthesis in FIG. 44. Transfer ring 241 is cylindrical in shape with an inner surface 2410, slot 2411, face 2412 and face 2413. Damping shoe 242 is cylindrical in shape with a gap running axially and tab 2424 protruding axially. Tab 2423 has face 2422 opposing face 2423. Damping ring 243 is cylindrical in shape with a gap running axially. Damping mechanism 240 comprises transfer ring 241, damping shoe 242 and damping ring 243. Damping ring 234 and damping shoe 242 are coaxial with transfer ring 241, face 2413 opposes face 2423. Face 2412 opposes face 2422.

Figure 36A:
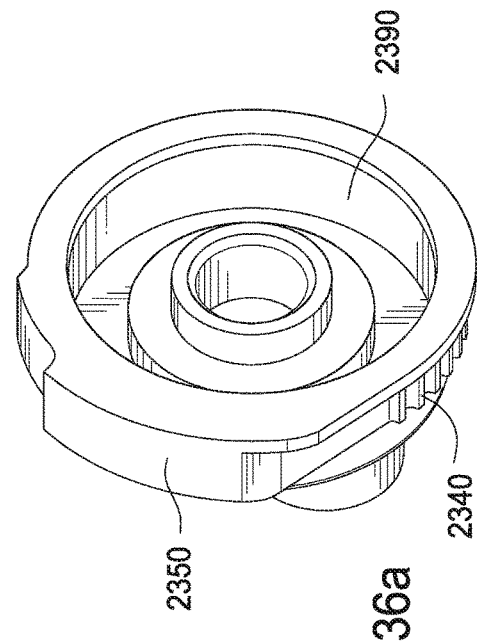
FIG. 36a is a perspective view of the arm in FIG. 37.

Face 2410 frictionally engages spring 360. Outward surface 2431 of damping ring 243 frictionally engages surface 2390 of lower eccentric arm 230, see FIG. 36a. Damping shoe 242 acts in a spring like manner pushing outside surface 2441 outward against inside surface 2442 and thus forces surface 2431 outward against surface 2390. The outward spring force creates the normal force for frictional engagement of damping mechanism 240 to arm 242. When arm 242 rotates into belt 200, spring 360 clutches and disengages damping mechanism 240. Arm 242 is free to rotate toward belt 200. When arm 242 rotates away from belt 200, the outer surface of spring 360 radially expands in the unwinding direction thereby clutching and engaging surface 2410 of damping mechanism 240. Rotation of arm 242 is resisted by the frictional engagement of damping mechanism 240 with arm 242.

Figure 45:
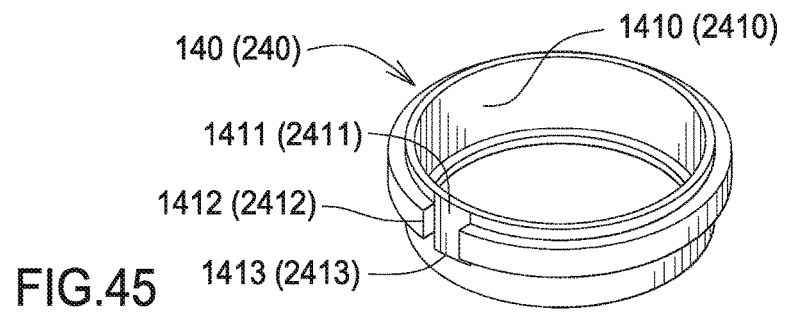
FIG. 45 is the damping mechanism for the embodiment in FIG. 30.

FIG. 45 is the damping mechanism for the embodiment in FIG. 30.

Figure 46:
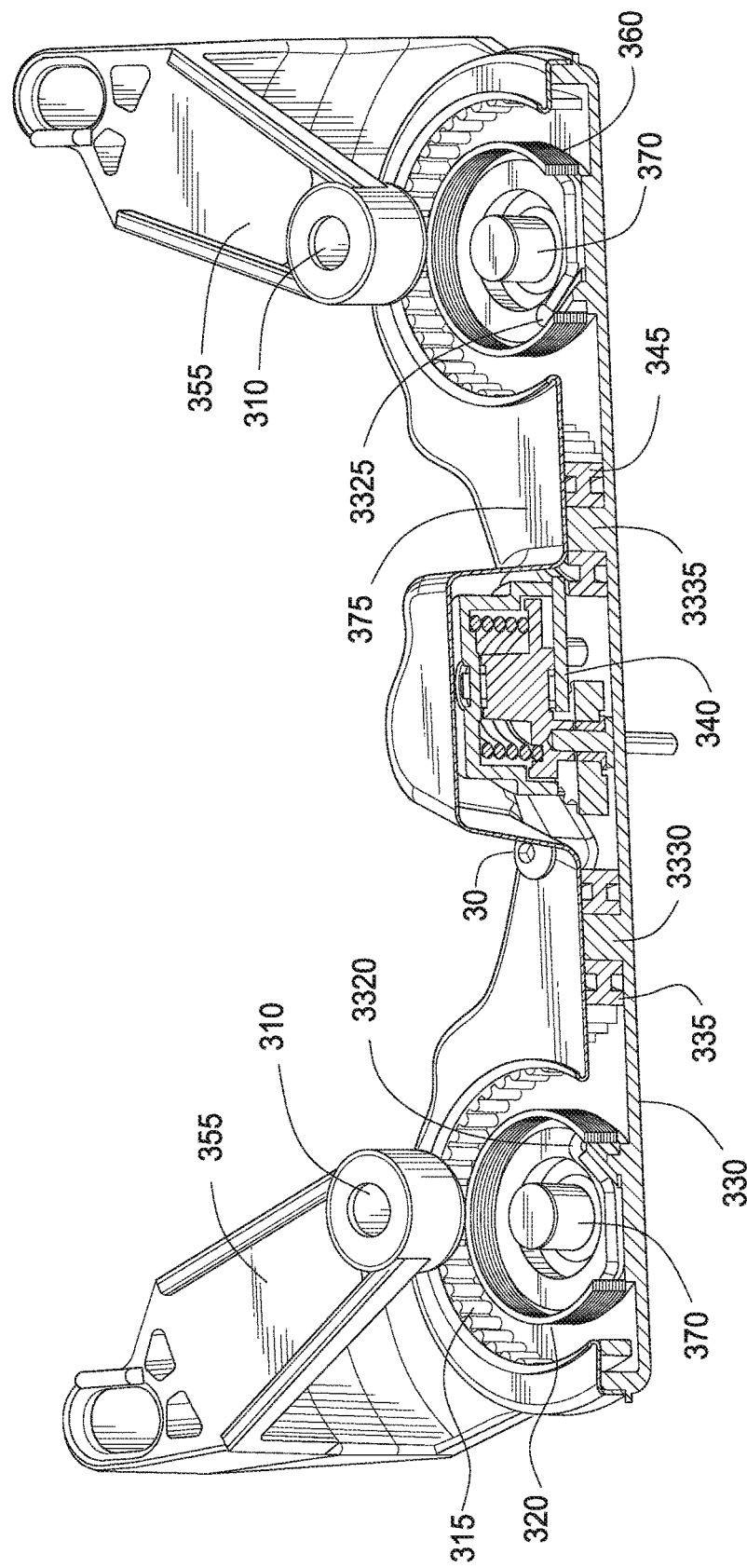
FIG. 46 is a cross section of the embodiment in FIG. 31.

FIG. 46 is a cross section of the embodiment in FIG. 31. Base assembly 300 comprises retainers 355, receivers 310, belt 315, spring 320, bushings 370, base 330, spring 360, cover 375, idler 335, idler 345, and tensioner assembly 340. Belt 315 is a toothed or synchronous belt. Belt 315 engages sprocket 1340 and sprocket 2340 of each arm 130 and 230 respectively. Belt 315 is attached to sprocket 1340 by tang 1360. Belt 315 is attached to sprocket 2340 by tang 2360. Each idler 335 and 345 has a smooth surface for engaging the back side of belt 315.

Arm 3200 of spring 320 resides within pocket 3320. Arm 3600 of spring 360 resides within pocket 3325. Tensioner assembly 340 is pivotally attached to post 3345 by fastener 20. Cover 375 is attached to base 300 by fastener 30 and fastener 25.

Figure 47:
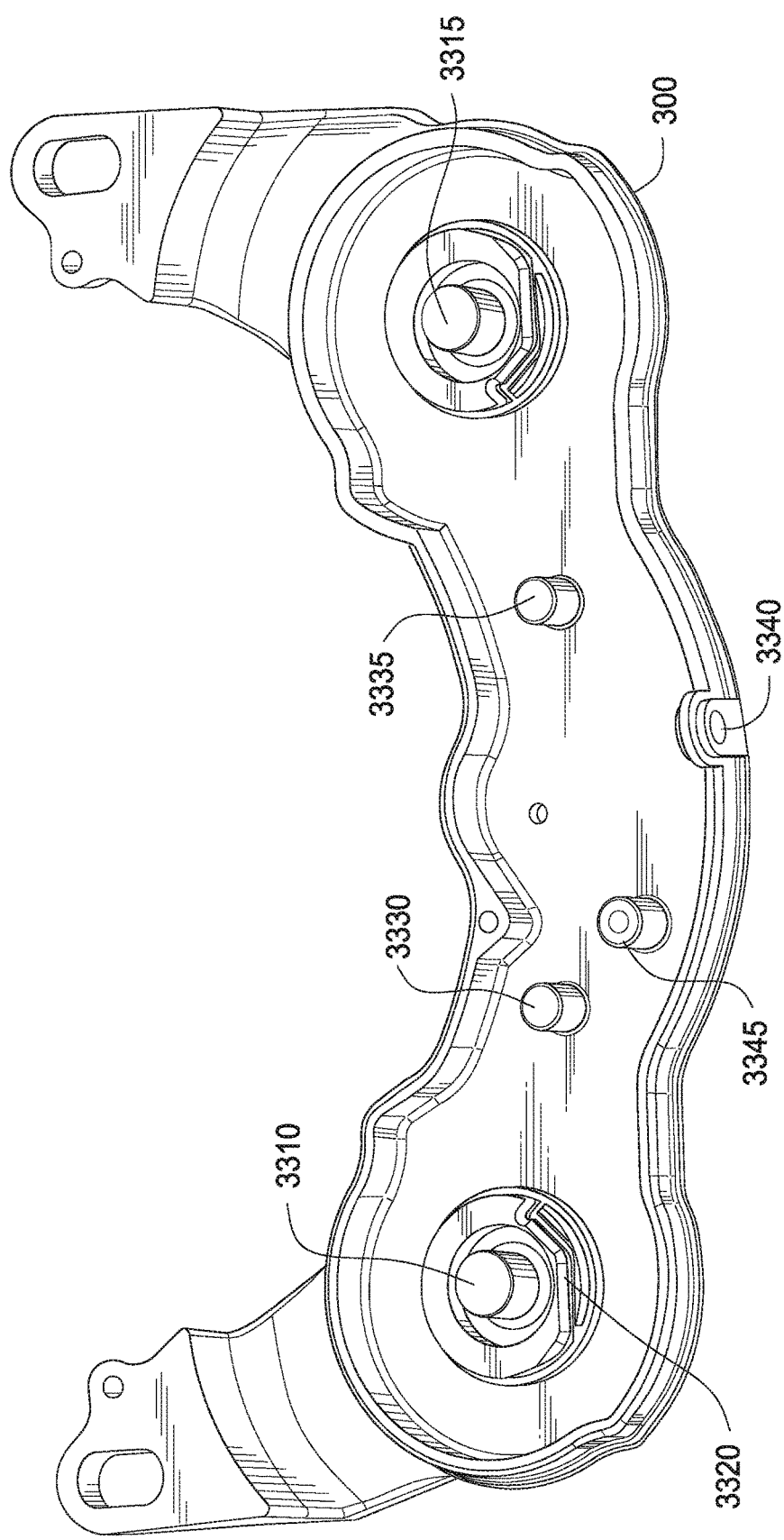
FIG. 47 is a detail of the base of the embodiment in FIG. 30.

FIG. 47 is a detail of the base of the embodiment in FIG. 30. Base 300 comprises cylindrical post 3310, cylindrical post 3315, cylindrical post 3330, cylindrical post 3335, cylindrical post 3345, receiver 3340, pocket 3320 and pocket 3325. Pocket 3320 receives arm 3200. Pocket 3325 receives arm 3600.

Idler 335 is journalled to post 3330. Idler 345 is journalled to post 3335. Bushing 325 is coaxial with post 3310. Bushing 370 is coaxial with post 3315. Pivot axis 1310 is coaxial with post 3310. Pivot axis 2310 is coaxial with post 3315. Adjuster 35 engages receiver 3340.

Figure 48:
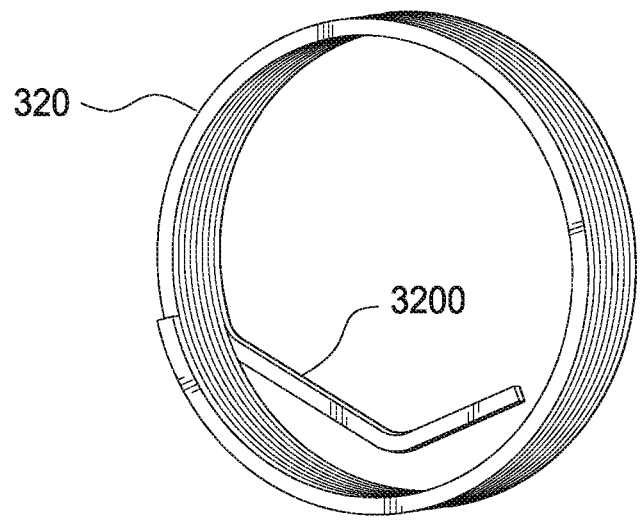
FIG. 48 is a detail of the spring of the embodiment in FIG. 30.

FIG. 48 is a detail of the spring of the embodiment in FIG. 30. Spring 320 comprises arm 3200 at one end. Arm 3200 engages pocket 3320, thereby anchoring arm 3200.

Figure 49:
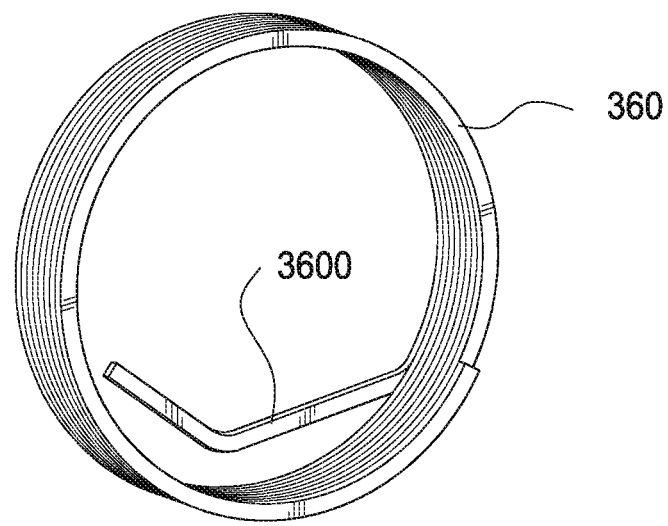
FIG. 49 is a detail of the spring of the embodiment in FIG. 30.

FIG. 49 is a detail of the spring of the embodiment in FIG. 30. Spring 360 comprises arm 3600 at one end. Arm 3600 engages pocket 3325, thereby anchoring arm 3600.

Figure 50:
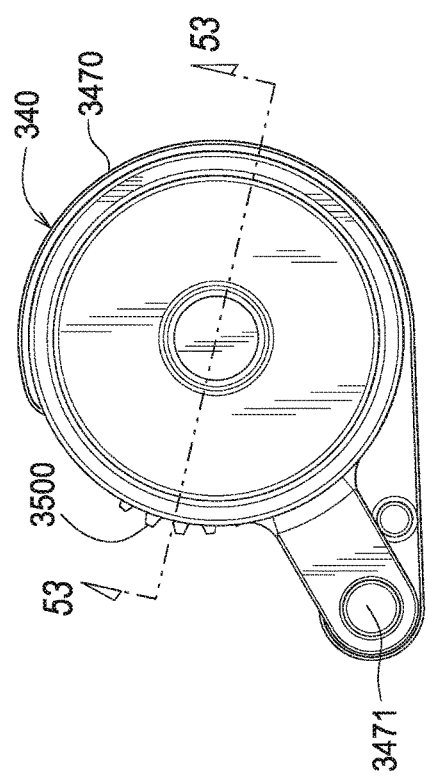
FIG. 50 is a plan view of the tensioner of the embodiment in FIG. 30.

FIG. 50 is a plan view of the tensioner of the embodiment in FIG. 30. Fastener 20 engages hole 3471.

Figure 51:
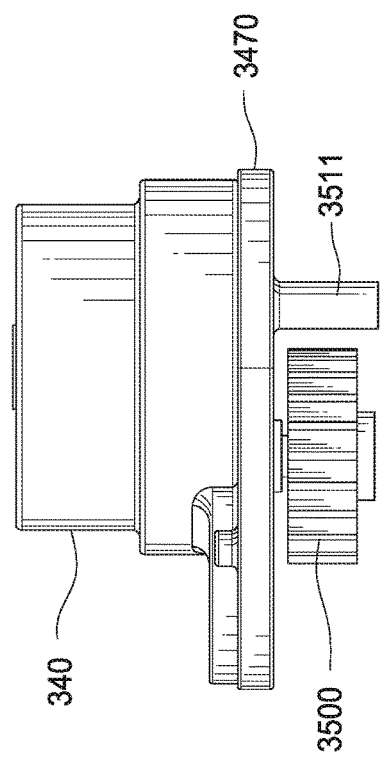
FIG. 51 is a side view of the tensioner in FIG. 50.

FIG. 51 is a side view of the tensioner in FIG. 50.

Figure 52:
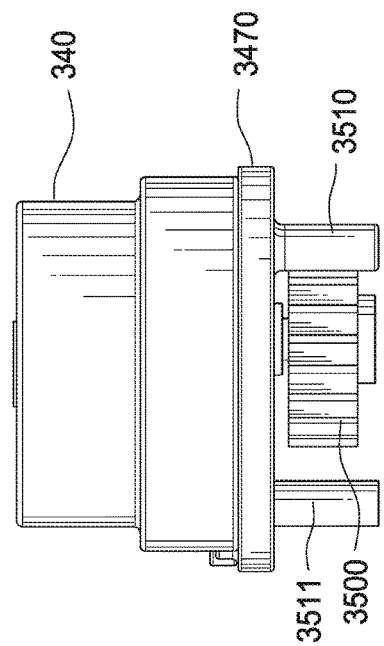
FIG. 52 is a side view of the tensioner in FIG. 50.

FIG. 52 is a side view of the tensioner in FIG. 50. Each pin 3510 and 3511 bears upon and locates tensioner 340 in base 300. Pins 3510 and 3511 provide clearance for idler 3500.

Figure 53:
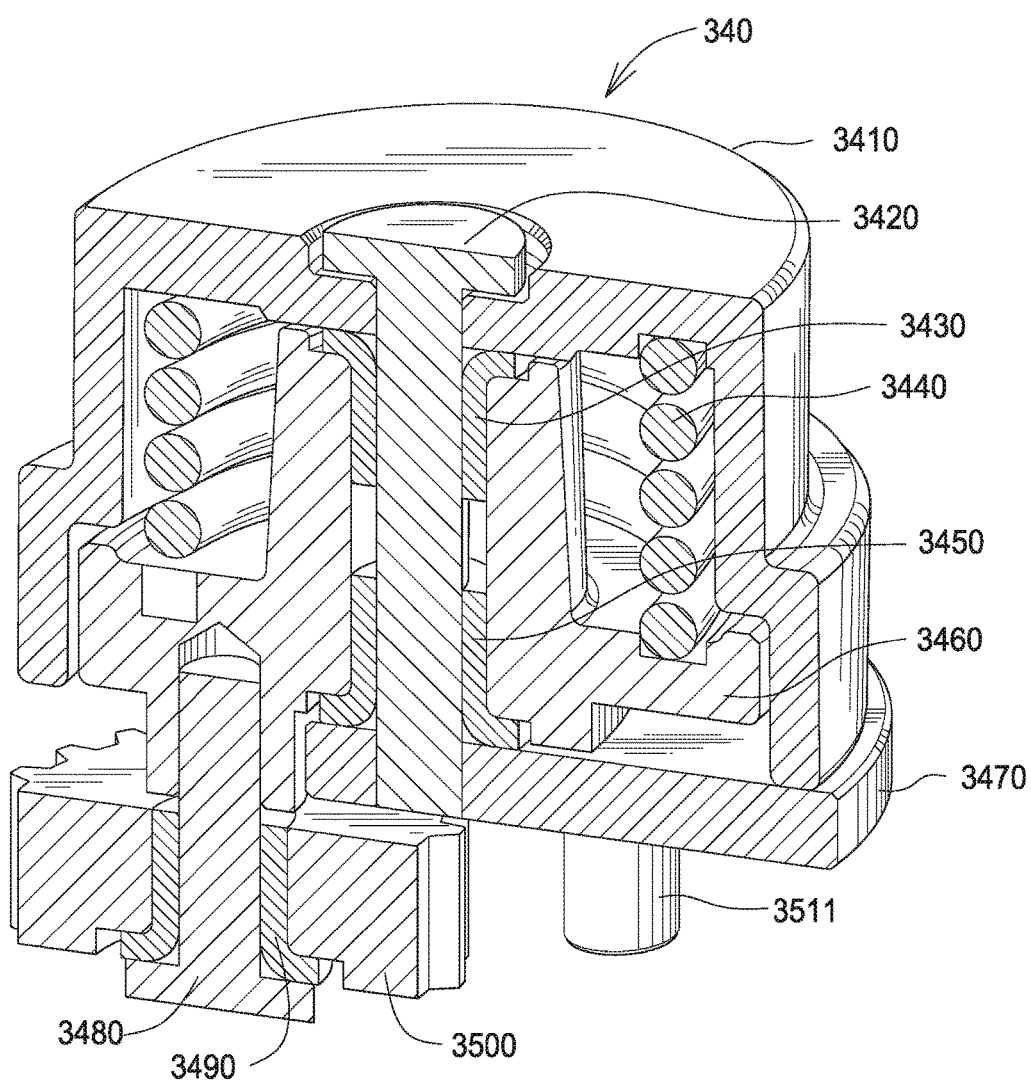
FIG. 53 is a cross section of the tensioner in FIG. 50.

FIG. 53 is a cross section of the tensioner in FIG. 50. Tensioner assembly 340 comprises cover 3410, pivot pin 3420, bushing 3430, torsion spring 3440, bushing 3450, arm 3460, base 3470, pin 3480, bushing 3490, and idler 3500. Bushing 3430 and bushing 3450 are coaxial with arm 3460. Spring 3340 is coaxial with arm 3460 and engaged between arm 3460 and cover 3410. Pivot pin 3420 is coaxial with arm 3460 and fixedly attached to base 3470. Pin 3480 is coaxial with bushing 3490 and fixedly attached to arm 3460. Idler 3500 is coaxial with bushing 3490. Tensioner assembly 340 is known in the art of automatic belt tensioners found commonly in automotive and industrial applications.

Figure 54:
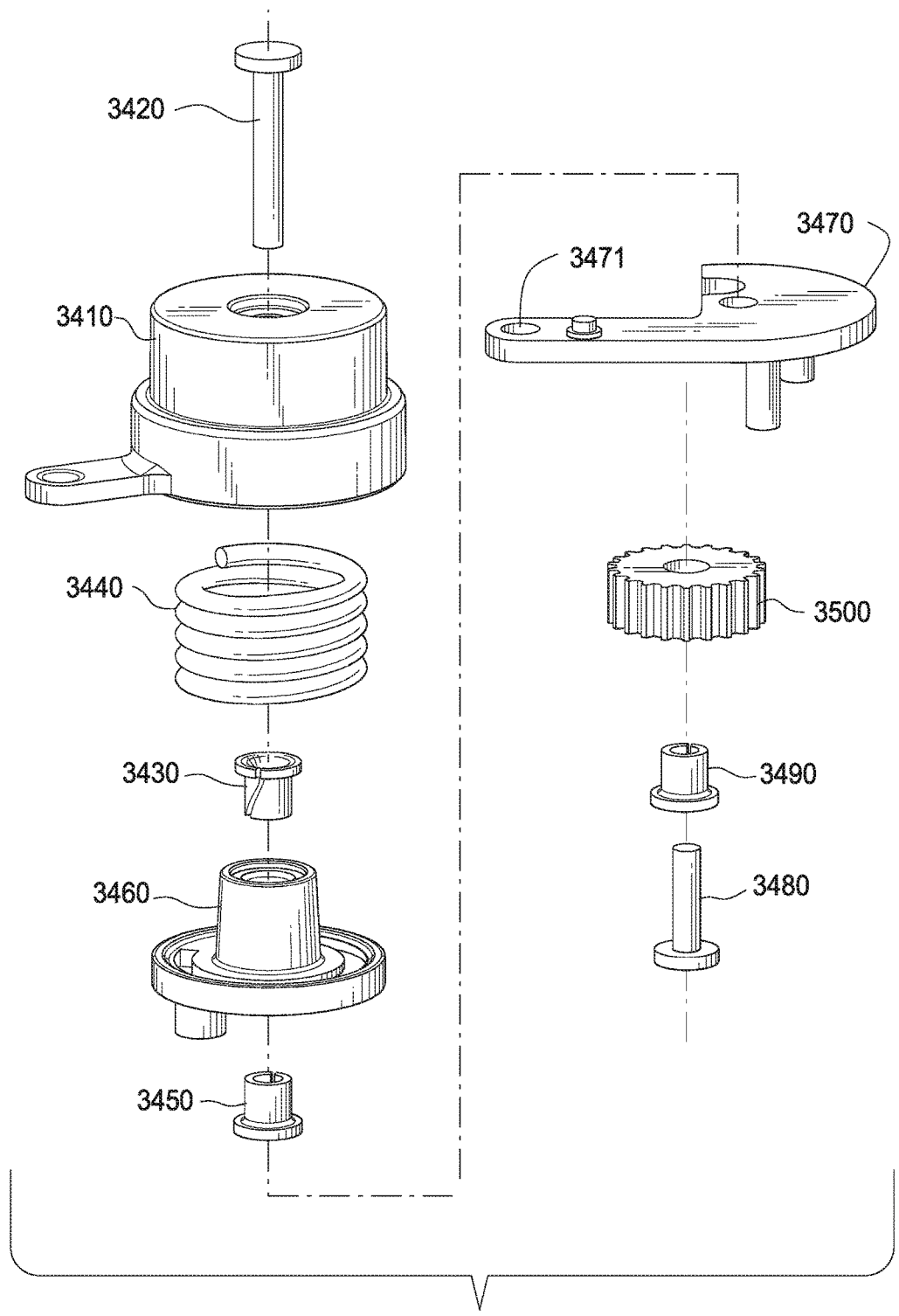
FIG. 54 is an exploded view of the tensioner in FIG. 50.

FIG. 54 is an exploded view of the tensioner in FIG. 50. Hole 3471 engages post 3345.

Figure 55:
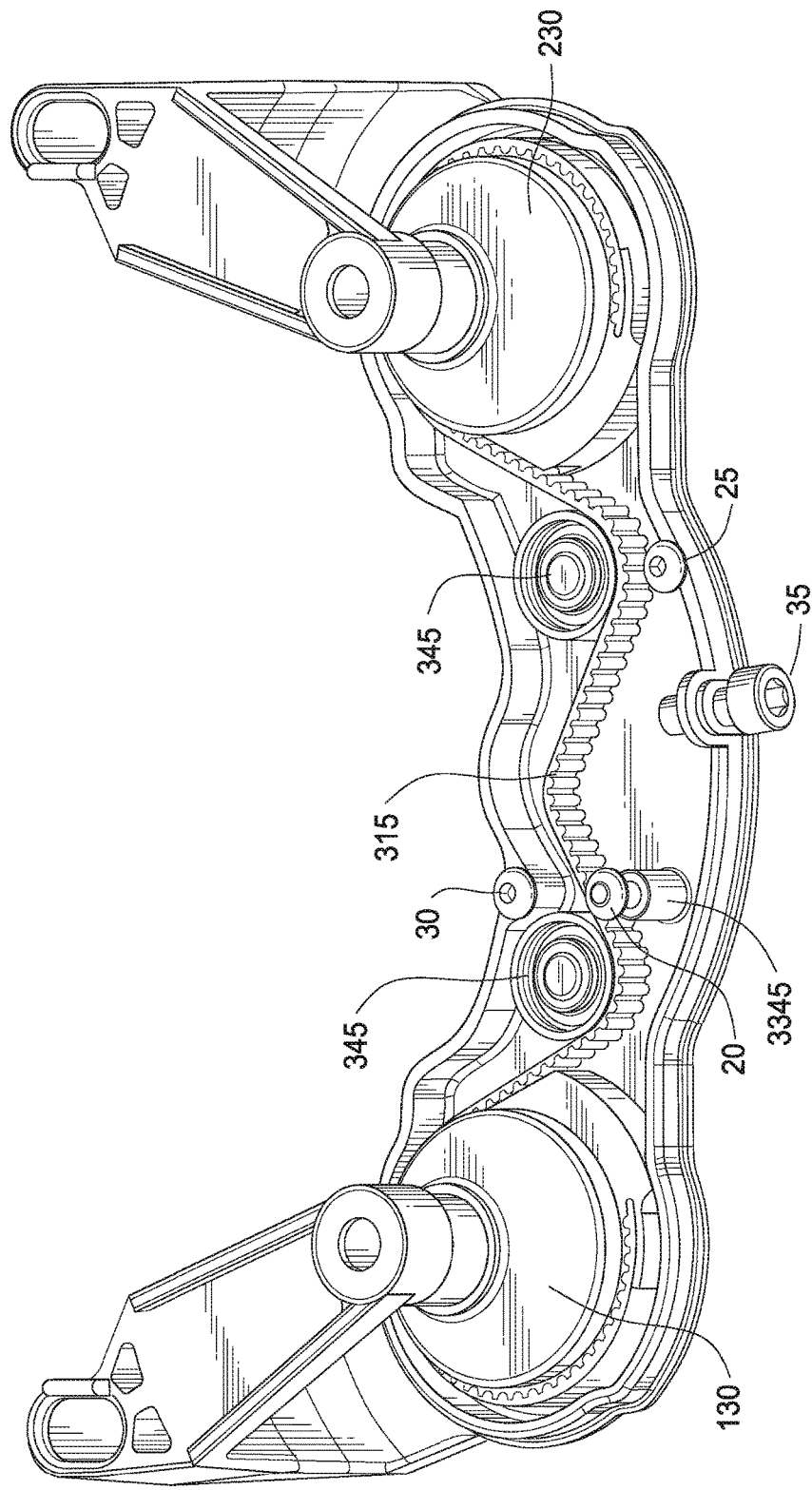
FIG. 55 is a detail of the base in FIG. 47.

FIG. 55 is a detail of the base in FIG. 47. Tensioner 340 pivots about post 3345. Adjuster 35 adjusts the position of tensioner 340 relative to belt 315, thereby adjusting the load imparted to belt 315.

Figure 56:
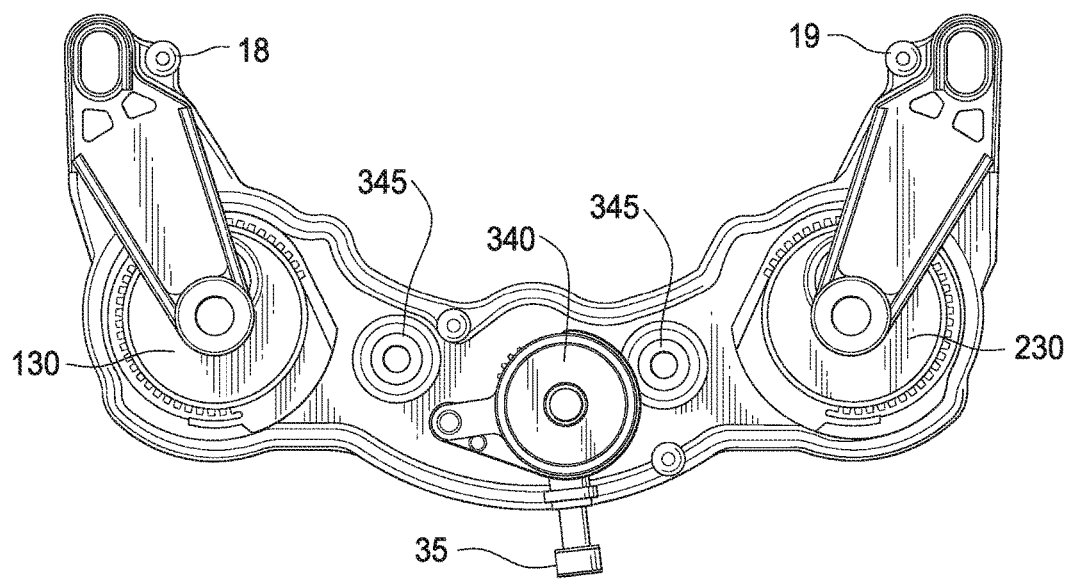
FIG. 56 is a detail of the base in FIG. 47.

FIG. 56 is a detail of the base in FIG. 47. Tensioner assembly 340 is installed such that its position is adjustable. Adjuster 35 is threadably engaged with base 3300. The position of adjuster 35 determines the position tensioner assembly 340. The extended position of adjuster is the initial installation position. Screwing in adjuster 35 causes tensioner 340 to pivot about post 3345 thereby applying a load to belt 315. This transitions the device to the contracted position (FIG. 57) which progressively increases the tension in ABDS belt 200. The belt 200 tension is adjusted in this manner for proper system performance.

Figure 57:
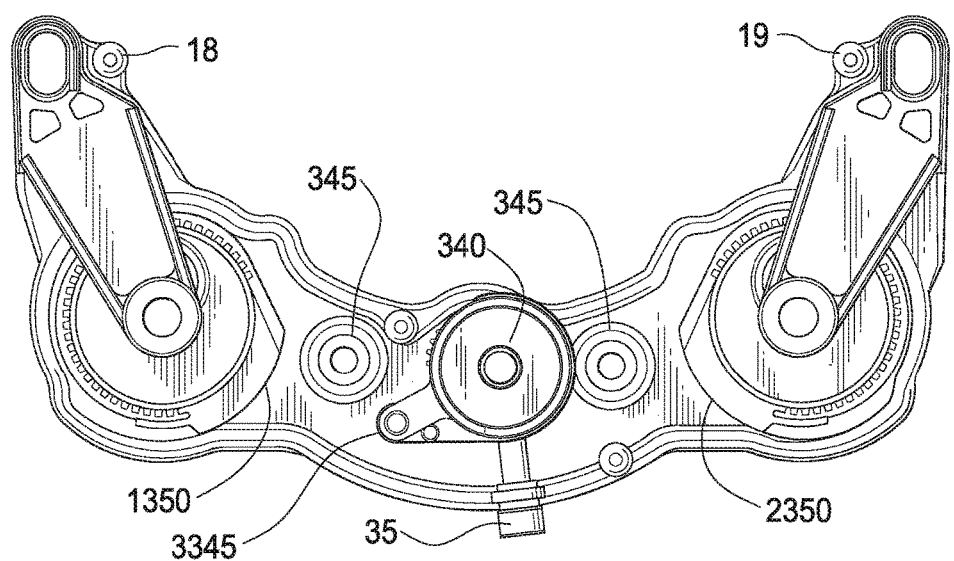
FIG. 57 is a detail of the base in FIG. 47.

FIG. 57 is a detail of the base in FIG. 47. Adjuster 35 is shown in the "screwed in" position which represents the position of maximum tension for belt 315 and belt 200, see FIG. 15.

This alternate embodiment incorporates cam 1350 and cam 2350. Cam 1350 and cam 2350 each engage belt 315. Given the engagement with belt 315 the angular motion of lower eccentric arm 130 and lower eccentric arm 230 are the same as long as arm 3460 of tensioner assembly 340 remains stationary.

It is desirous to raise the tension in the slack side of belt 200 during certain operating events as explained elsewhere in this specification, see FIG. 15. This is achieved by deflecting arm 3460, which deflects spring 3440 thereby raising the torque in arm 3460. The torque in arm 3460 is opposed by the tension in belt 315 in the form of the hub load on idler 3500. Deflecting arm 3460 away from belt 315 increases the torque in arm 3460. This causes the tension in belt 315 to increase and thus the tension in the slack side span of belt 200.

When lower eccentric arms 130 and 230 each rotate clockwise as seen in FIG. 56, cam 2350 engages belt 315 while cam 1350 rotates away from belt 315. This increases the take up of belt 315 causing arm 3460 to deflect, which raises tension in belt 315. This increases the tension in belt 200. Conversely, if lower eccentric arm 130 and 230 rotate counterclockwise as seen in FIG. 56, cam 1350 engages belt 315 while cam 2350 rotates away from belt 315. This increases take up of belt 315 causing arm 3460 to deflect raising tension in belt 315. This increases the tension in the slack side span of belt 200.

In operation each cam profile 1350, 2350 enables additional take up of belt 315. The additional take up of belt 315 has two advantages. It increases deflection of the tensioner 340 which increases movement of the slack side arm (idler 100) attached to the end of belt 315. The increased deflection of tensioner 340 gives an additional level of tension control to the overall device. The shape of the cam profiles can dramatically change the slack side tension of belt 200, namely, radius R2 can be varied. The increased movement of the slack side tensioner arm is such that in an increasing accessory belt 200 load situation the arm is moving into the belt at a greater rate with the cam than without it. This raises slack side tension of belt 200 at an increased rate. This provides the ability to further tune the tensioner to the desired application.

The alternate embodiment adds the transfer ring 141, 241 to each damping mechanism 140, 240. Transfer ring 141, 241 absorbs the pressure from each clutch spring 320, 360 and separates it from the respective damping shoe 142, 242. Each damping shoe is rotationally fixed to each transfer ring 141, 241 enabling clutching and enabling control of the normal force on the damping ring by the damping shoe.

The tensioner assembly 340 is a miniature Z-style tensioner known in the art. The tensioner occupies otherwise unused space within the plane of the belt 200. Tensioner 340 is mounted such that its position is adjustable. The position of fastener 35 determines the position of tensioner assembly 240. This enables one to control the installation tension in 200 by simply adjusting fastener 35. Moving tensioner assembly 340 into the belt 315 raises the belt tension thus raising the accessory belt 200 tension.

Although forms of the invention have been described herein, it will be obvious to those skilled in the art that variations may be made in the construction and relation of parts and method without departing from the spirit and scope of the invention described herein.

We claim:

1. A tensioner comprising:
a base;
a first pivot arm pivotally engaged to the base for an eccentric movement about a first axis, a first pulley journalled to the first pivot arm;
a second pivot arm pivotally engaged to the base for an eccentric movement about a second axis, a second pulley journalled to the second pivot arm;
a flexible tensile member engaging the first pivot arm and the second pivot arm;
a tensioner assembly pivotally engaged to the base and engaged with the flexible tensile member;
a first damping assembly frictionally engaged with the first pivot arm, the first damping assembly exerting a greater damping force on the first pivot arm in a first direction than a second direction;
a second damping assembly frictionally engaged with the second pivot arm, the second damping assembly exerting a greater damping force on the second pivot arm in a first direction than a second direction; and
the first pivot arm comprising a first cam portion progressively engaging the flexible tensile member such that a first pivot arm torque is variable.

2. The tensioner as in claim 1, wherein the second pivot arm further comprises a second cam portion progressively engaging the flexible tensile member such that a second pivot arm torque is variable.

3. The tensioner as in claim 1, wherein the tensioner assembly comprises:
a tensioner pivot arm;
a tensioner pulley journalled to the tensioner pivot arm;
a tensioner torsion spring engaged between the tensioner pivot arm and the base; and
the tensioner pivot arm applying a load to the flexible tensile member through the tensioner pulley.

4. The tensioner as in claim 3, wherein a position of the tensioner is adjusted by an adjustment member with respect to the flexible tensile member.

5. The tensioner as in claim 3 further comprising an idler journalled to the tensioner pivot arm, the idler engagable with the flexible tensile member.

6. The tensioner as in claim 1, wherein the flexible tensile member comprises a toothed belt.

7. The tensioner as in claim 1 mounted to an alternator.

8. The tensioner as in claim 1, wherein the flexible tensile member is not endless.

* * * * *